US012762620B2

(12) United States Patent
Grover et al.

(10) Patent No.: US 12,762,620 B2
(45) **Date of Patent: *Oct. 13, 2026**

(54) LATENCY MANAGER

(71) Applicant: BGC PARTNERS, L.P., New York, NY (US)

(72) Inventors: Daniel Grover, New York, NY (US); Virginia Guadagno, New York, NY (US)

(73) Assignee: BGC PARTNERS, L.P., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/044,810

(22) Filed: Feb. 4, 2025

(65) Prior Publication Data

US 2025/0182175 A1 Jun. 5, 2025

Related U.S. Application Data

(63) Continuation of application No. 18/140,005, filed on Apr. 27, 2023, now Pat. No. 12,248,972, which is a continuation of application No. 17/018,417, filed on Sep. 11, 2020, now Pat. No. 11,669,877.

(60) Provisional application No. 62/898,794, filed on Sep. 11, 2019.

(51) Int. Cl.

| | |
|---|---|
| ***G06Q 40/04*** | (2012.01) |
| ***G06F 12/0875*** | (2016.01) |
| ***G06F 16/21*** | (2019.01) |
| ***H04L 43/0852*** | (2022.01) |

(52) U.S. Cl.
CPC ..... *G06Q 40/0451* (2025.08); *G06F 12/0875* (2013.01); *G06F 16/219* (2019.01); *H04L 43/0852* (2013.01); *G06F 2212/1008* (2013.01)

(58) Field of Classification Search
CPC .... G06Q 40/0451; G06Q 40/04; G06Q 40/06; G06Q 30/0611; G06F 12/0875; G06F 16/219; G06F 2212/1008; H04L 43/0852
See application file for complete search history.

(56) References Cited

U.S. PATENT DOCUMENTS

2004/0167840 A1* 8/2004 Tully ..................... G06Q 40/06 705/35
2013/0044583 A1* 2/2013 Chuang ............... G06F 16/2428 370/216

FOREIGN PATENT DOCUMENTS

CA 2421825 C * 7/2012 ............... G06F 8/71

OTHER PUBLICATIONS

Byrd et al.: The Importance of Low Latency of order Book Imbalance Trading Strategies, Jun. 15, 2020, pp. 1-7 (Year: 2020).*

(Continued)

*Primary Examiner* — Bijendra K Shrestha

(57) ABSTRACT

Techniques to help reduce latency and improve computer performance including managing latency between client computers over a network with server computers including determining configurable time period, communicating quote data to client computers, determining most recent quote data from a cache and determining whether to execute quote data based on quote version data and time data associated with the quote data and based on the configurable time period.

12 Claims, 12 Drawing Sheets

(56) References Cited

OTHER PUBLICATIONS

Shatner et al.: A Continuous Time Asynchronous Model of the Stock Market: Beyond the LLS Model, Nov. 2, 2018, pp. 1-14 (Year: 2018).*

* cited by examiner

Assumptions: Pre-Latency Manager flow has been enacted, all quotes are in quoted state

| | Latency Manager Timeline | | | | | | | | | |
|---|---|---|---|---|---|---|---|---|---|---|
| | 13:00:00 | 13:00:02 | 13:00:04 | 13:00:05 | 13:00:07 | 13:00:08 | 13:00:10 | 13:00:12 | 13:00:14 | 13:00:16 |
| Message QuoteId in Queue | ABC-0-T | ABC-1-T | ABC-2-T | ABC-3-T | ABC-4-T | ABC-4-T | | XYZ-0-T | XYZ-1-T | XYZ-1-T |
| EXTERNAL_RFQVERSION variable value | 0 | 1 | 2 | 3 | 4 | 4 | | 0 | 1 | 1 |
| Quote added to Cache[1] | | ABC-0-T | ABC-1-T | ABC-2-T | ABC-3-T | | | | XYZ-0-T | |
| Execution Message Received | | | | ABC-0-T | | ABC-3-T | | | | XYZ-1-T |
| Quote(s) removed from Cache[2] | | | | | | ABC-0-T | | | | |
| Match EXTERNAL_RFQVERSION variable? | | | | No | | No | | | | Yes |
| Quote version exist in Cache? | | | | Yes | | Yes | | | | No |
| Quote within 3s OldQuoteExecution Time buffer? | | | | No | | Yes | | | | No |
| Action | | | | Message sent[4] | | Trade Executed | | | | Trade Executed |
| Quotes cleared from queue after execution | | | | | | ABC-1-T, ABC-2-T, ABC-3-T, ABC-4-T | | | | XYZ-0-T |

[1] When new quote version is received, previous quote version is moved to cache and receives a "QuoteVersionReplacementTimestamp" which is used when evaluting the age of the quote version data

[2] OldQuoteExecutionTimeBuffer value is 3 seconds

[3] Quotes versions are removed after 2*OldQuoteExecutionTimeBuffer = 6 seconds

[4] "Quote has been replaced, technical issue relating to quote/status history"

QuoteId is a unique id created for quote message sent with updated quote, ex. ABC-3-T 'ABC' is a unique id for quote '3' is the quote version for the unique id which will be increased by 1 every time quote is updated 'T' is the execute direction: T (Trade as is) or O (Trade as opposite)

600

FIG. 6

FENICS Direct provides users with an aggregated view of multi-dealer liquidity for FX derivatives. Operating as a component within BGC Group's fully electronic FX product portfolio, FENICS Direct is a web-delivered platform offering bespoke strategy creation, instantaneous price discovery, and name disclosed bilateral trade execution through on single interface.

Increased regulation within global financial markets has promoted trading in multi-lateral, data rich environments. Accordingly, FENICS Direct benefits users with access to kACE's (formerly known as Fenics Trading Solutions) powerful FX analytic and risk management tools.

700

FIG. 7A

- Liquidity requestors may price utilizing multiple providers' volatility surfaces
- Dual Multi-bank Request for Stream ("RFS") (fully automated response via API) or Request for Quote ("RFQ") (manual response via GUI for particular strategies) model allows liquidity providers to respond in competition
- Web-deployed for ease of implementation
- Users may view indicative pricing anonymously
- Fully electronic workflow to increase efficiency and enable complete data capture
- Straight Through Processing (STP) directly to users' desktop or into their risk management systems to reduce operational risk

700

FIG. 7B

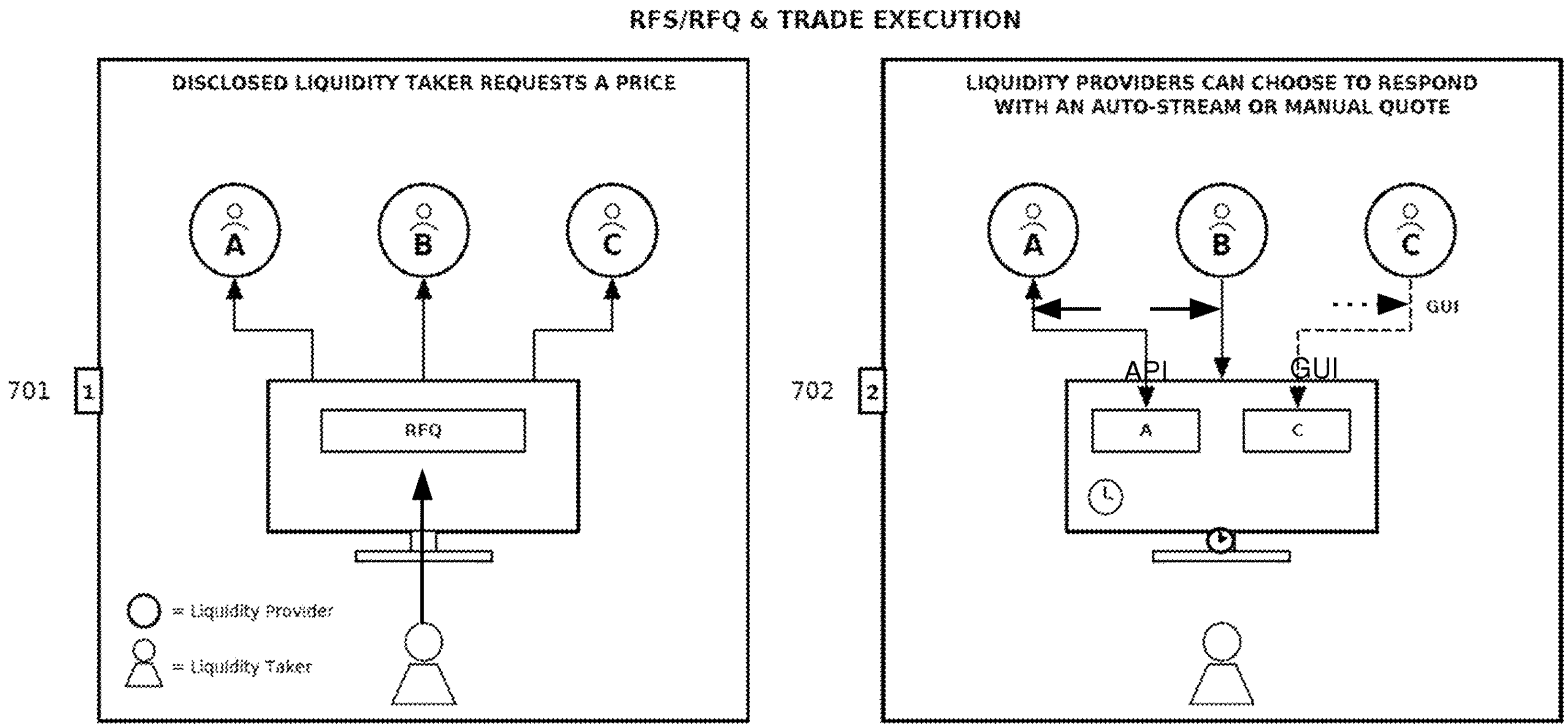

Price Discovery

- Full volatility surfaces for major currency pairs and various crosses from multiple liquidity providers
- Quotes and trades are visible only to requestor and liquidity provider ensuring quote and trade privacy for both counterparties
- Strategies Supported: Call/Put, Call spread, Put spread, Calendar spread, Straddle, Strangle and Risk reversal

Request for Stream (RFS) / Request for Quote (RFQ)

- Single-click submission of RFS/RFQ to multiple liquidity providers from the pricing page
- Multi-legs and Exotics to be added in 2019
- Support for quotes in either volatility or premium
- Choice of spot, forward, or no hedge
- Choice of spot or forward premium

FIG. 7C

700

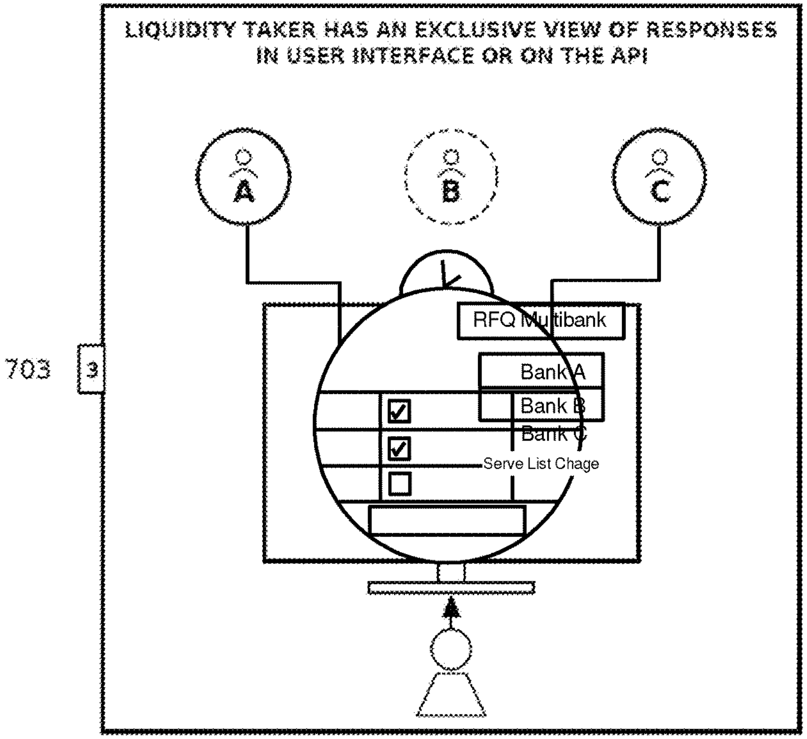

Trade Execution

- Electronic bilateral execution on any live quote
- Countdown timer displays remaining quote duration
- Messages display successful executions and other status changes

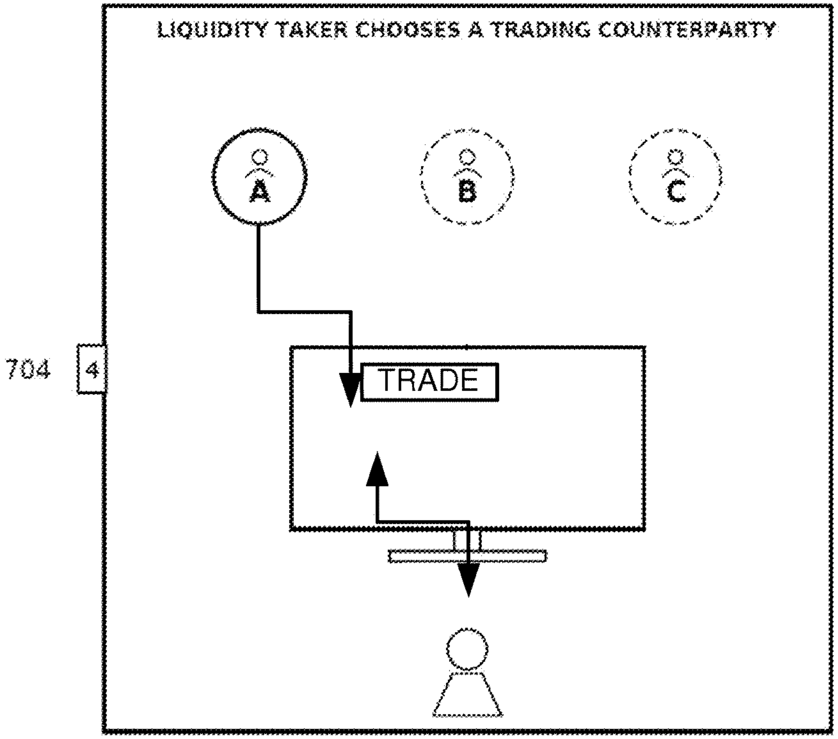

Trade Checkout and STP

- FX Blotter lists all trade details
- Fenics Direct STP Monitor alerts user whenever a trade is executed on FENICS Direct
- STP connectivity provided through RTNS, FIX, XML, CSV, kACE software and MarkitWire

700

FIG. 7D

LATENCY MANAGER

CROSS REFERENCE TO RELATED APPLICATION

This application is a continuation of U.S. patent application Ser. No. 18/140,005 filed Apr. 27, 2023, which is a continuation of U.S. patent application Ser. No. 17/018,417 filed Sep. 11, 2020 (now U.S. Pat. No. 11,669,877 issued Jun. 6, 2023), which claims priority to U.S. Provisional Patent Application No. 62/898,794 filed Sep. 11, 2019, each of which are incorporated by reference herein in its entirety.

BACKGROUND

Computer systems may include computer networks to allow server computers to communicate with client computers and other computers. The client computers may request data from the server computers over the computer networks. The client computers may then review the data for subsequent execution by the server computers. However, the client computers may experience delays in processing data which may be caused by latency in the system, including the networks.

BRIEF DESCRIPTION OF THE DRAWINGS

FIG. 6 is an example time line diagram in accordance with aspects of the present disclosure FIGS. 7A through 7D is an example exchange platform in accordance with aspects of the present disclosure.

DETAILED DESCRIPTION

Figure 1:
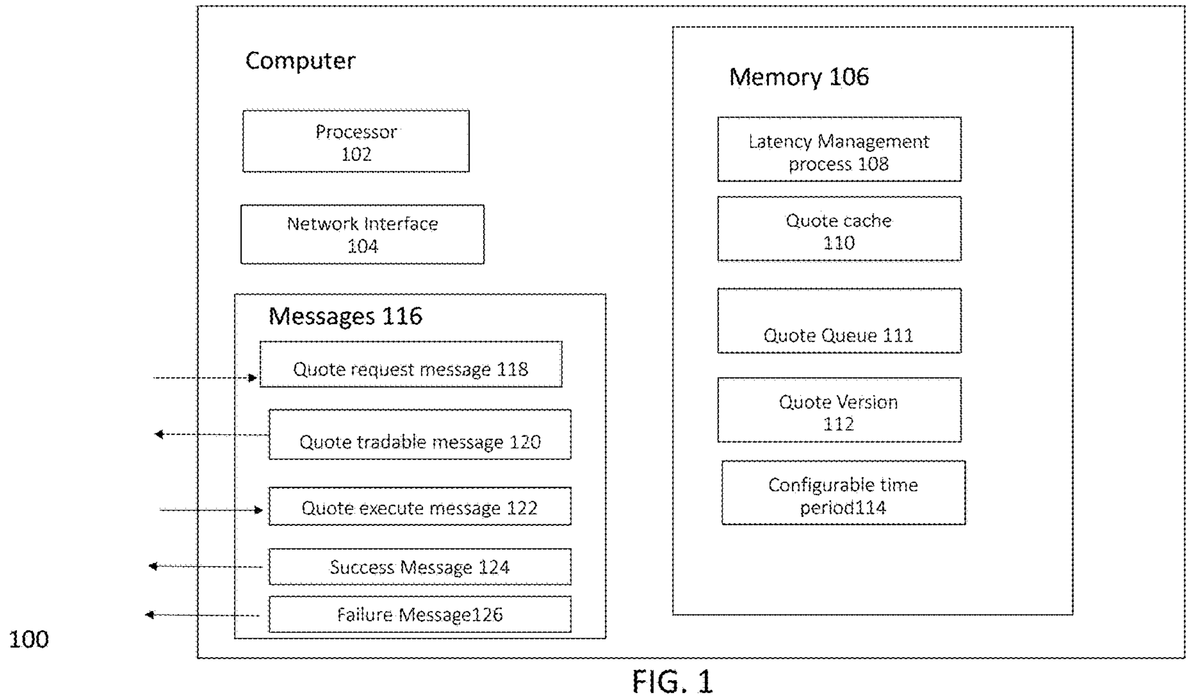
FIG. 1 is an example apparatus in accordance with aspects of the present disclosure.

Computer systems may include computer networks to allow server computers to communicate with client computers and other computers. The client computers may request data from the server computers over the computer networks. The client computers may then review the data for subsequent execution by the server computers. However, the client computers may experience delays in processing the data which may be caused by latency in the system including the networks. It may be important for the computer systems to manage or reduce system latency including network latency. In accordance with one example, techniques are disclosed herein which may help reduce latency and improve computer performance.

In one example, the present disclosure provides techniques for managing latency over a network between client computers and server computers. For example, a client computer may request quote data from a server computer over a network. In one example, the quote data may be related to a financial instrument such as an option. In one example, an option contract may be associated with an expiration date by which the holder must exercise their option. The options also include a stated price known as the strike price. In one example, users may purchase and sell options through financial institutions. In one example, options may be financial derivatives that provide buyers with the right, but not the obligation, to buy or sell an underlying asset at an agreed-upon price and date. In one example, call options and put options form the basis for option strategies such as hedging, income, or speculation.

The computer system may experience network latency and processing time delay. As a result, a user of a client computer may not be able to respond to a quote before it has been pulled or replaced with a more recent quote. This may be caused by latency or delays from computer systems including computer networks. This latency may make it frustratingly difficult or impossible for the user to execute trades on a system. In one example, the techniques of the present disclosure may help reduce such latency in such systems. In one example, the techniques provide a queue and retain a list or queue of recent quotes for each version and apply a version identifier to each quote. If an execute request is received by server for a version that is less than a configurable age, the server may execute the saved quote though not necessarily the most recent quote version. In one example, the techniques of the present disclosure may help reduce such latency in systems.

In one example, quote messages may pertain to any financial or commodity instruments. In one example, quotes and related messages may include a collection of field names and values (currency pairs, strike price, expiry date, delivery date, face amount, counterparty, etc.). In one example, the quotes and messages may pertain to options on foreign exchange. In one example, a message pertaining to an option on foreign exchange may include the following information: Contract currency, e.g. Euro, Counter-currency, e.g. US Dollar, Option type, e.g. European Call, whereby the buyer of the contract has the right, but not the obligation, to exchange the contract currency for the counter currency at the strike price, on the expiration date prior to the cutoff time, Strike price, e.g. 1.1055, the rate at which Euros will be exchanged for US Dollars if the option is exercised, Expiration Date, e.g. 11 Dec. 2019, the date that the contract expires, Cutoff Time, e.g. 10:00 AM New York, the time at which the contract expires, Delivery Date, e.g. 13 Dec. 2019, the date that the currencies will be settled if the option is exercised, Face Amount, e.g. EUR 10,000,000, the amount of the contract currency which will be exchanged for the counter currency, Premium, e.g. USD 7,500, the amount that the buyer of the option contract pays for the seller.

The techniques of the present disclosure have been described in the context of quote data related to financial instruments such as options. However, it should be understood that the techniques of the present disclosure may be applicable to other financial instruments such as stocks, bonds, foreign exchange, futures, warrants and the like. In addition, it should be understood that the techniques of the present disclosure may be applicable to other applications such as online auctions, online purchases and the like.

In one example, a system may include a server computer such as quote server that can provide quotes (which may include price and volume data associated with the quote) for financial instruments to a client computer. The client may submit a request for a quote which is assigned an identifier of ID "ABC". The server may then provide or supply the client with a stream or series of quotes for that request, ABC-1, ABC-2, ABC-3, etc. The server may send messages to the client computer that may cause the stream of quotes to be displayed on GUI (graphical user interface) of a display of the client computer. The server also may store quote data with a timestamp. After a configurable amount of time, quotes are expired.

In one example, continuing with example, the client or user may view the stream of the quote data on the display of the client computer. While the user is viewing and considering whether to execute the quote ABC-3, the server (system) may have already transmitted or sent over the network to the client updated or new quotes (quote streams) ABC-4, ABC-5, and ABC-6. However, because of system latency due to various delays based on network, client and server systems, the new updated stream may not have yet reached the client computer for viewing by the user at the client computer. The user may attempt to execute a trade on quote ABC-3 and then generate an execute request which is transmitted from the client to the server. The server may respond to the request to execute a trade on quote. The server determines whether the quote ABC-3 is present in the list of quotes (quote cache) for quote ABC. The server may check the age of quote ABC-3 and may verify that quote ABC-3 is not older than a configurable timeout period. The server may proceed to execute the quote ABC-3 even though quote ABC-6 is the more recent quote. The client computer may then ignore or disregard additional quotes.

In another example, the techniques may help manage or reduce latency between client computers and server computers over a network. In one example, a client may request quote data related to a financial instrument from a server a network. The system may experience a latency or delay. In one example, there may be a time delay between the time the data is sent from the server through the network and to the client before the data appears on the GUI of the client computer. The client may receive a first version of the data and decide to respond with a request to execute a trade on the quote data.

In one example, the quote data may be related to a financial instrument. In this case, the quote data may involve spot data which may involve transmission of data streams and updates with a hedge on the option which may impact the overall price of the option. The spots streams move very quickly with currency pairs so by the time the quote reaches the client, the data may be stale and a new version may be available. In this case, the client may frequently be unable to successfully execute quotes because of the latency. The server computer may be a company that is a liquidity provider for the particular instrument. The server may receive complaints from a trade exchange platform because the client keeps experiencing rejections to execution requests when attempting to request to trade a quote.

In another example, the techniques may help manage or reduce latency between client computers and server computers over a network. In this case, the server computer may attempt to adjust or calibrate a configurable time period so to allow the client to process more quotes and reduce the number of rejected requests. In one example, the server may include a latency manager so to provide additional time delay or latency to help manage or reduce the amount of rejections. In this case, these techniques may allow clients to execute trade quotes which would otherwise have been dropped or rejected. For example, the latency manager may increase a time buffer to deal with the latency of sending data to the client from the server. In one example, this may allow the older quotes to remain on a cache for a longer period of time to allow the client to still execute trades on the quotes.

In one example, the techniques of the present disclosure may help manage or reduce such latency in systems.

The latency management techniques of the present disclosure provide technical advantages to various areas of the technical field including computer technology, network technology and the like. For example, the techniques provide an improvement in the functioning of a computer, or an improvement to other technology or technical field. In one example, these latency management techniques help control activity over the network and control computer workload including computer resources such as memory resources, processor resources, and network resources such as network bandwidth. In one example, these techniques help manage or reduce latency and improve computer performance. In one example, these latency management techniques help overcome a problem specifically arising in the realm of computer networks because they help manage or reduce transmission and execution errors caused by network delays. In one example, these latency management techniques help improve the functioning of the computer by overcoming a problem specifically arising in the realm of computer networks because they help manage or reduce transmission and execution errors caused by network delays. In one example, these latency management techniques help improve the functioning of the computer networks and network bandwidth and workload because they help manage or reduce transmission and execution errors caused by network delays. In one example, these techniques include managing latency between client computers over a network with server computers including determining configurable time period, communicating quote data to client computers, determining most recent quote data from a cache and determining whether to execute quote data based on quote version data and time data associated with the quote data and based on the configurable time period. Further, these techniques are directed to subject matter that is not well-understood, not routine, not conventional activity and thus provide inventive concept.

In one example, a computer may be configured to implement the techniques of the present disclosure. In one example, a computer proceeds to calculate a configurable timeout period based on a time difference between transmission of a message to an external system and receipt of a response to the message from the external system. The computer proceeds to receive, via the network interface, from a client computer, a quote request message to request to receive a stream of quote data versions related to a financial instrument. The computer proceeds to determine a stream of quote data versions based on updates from quote data sources. The computer proceeds to transmit, via the network interface, to the client computer a quote tradable message that includes the stream of quote data versions which are obtained from the quote queue. The computer proceeds to determine a latest queue version from the plurality of quote data versions which is based on a most recently received quote data version compared to an earlier received quote data version. The computer proceeds to determine whether to copy the latest quote data version to the quote cache. The computer proceeds to periodically check the quote cache to determine whether to remove a quote data version from the quote cache. The computer proceeds to receive, via the network interface, from the client computer, a quote execute message indicating a request to execute a requested quote data version selected from the stream of quote data versions. The computer proceeds to determine whether to execute the requested quote data version based on whether the requested quote data version matches the latest quote version. The computer proceeds to determine whether to execute the requested quote data version based on (a) whether the requested quote data version is present in the quote cache and (b) whether a time age of the requested quote data version is less than the configurable time period.

In another example, the computer proceeds to determine the time age is calculated based on a difference between a system time stamp of the client request and a time stamp of the requested quote data version when placed in the quote cache. In another example, the computer determines to remove the quote data version from the quote cache based on a time age of the quote data version is greater than the configurable time period. In another example, the computer determines to storing quote data versions to a quote queue and then copying the quote date versions to the quote cache and transmitting to the client computer the quote date versions. In another example, the computer determines to exchange messages with a client computer comprises exchanging messages through a platform computer. In another example, the computer determines transmission of responses to the client computer comprises transmission of messages to cause to interact with the network interface of the apparatus and a network interface associated with the client computer to cause display of the plurality of quote data on a graphical user interface of the client computer.

In another example, the present disclosure provides a method and a non-transitory computer-readable media, having stored thereon instructions that, when executed by a processor, cause the processor to implement the method implemented by the apparatus features or claims.

The aspects, features and advantages of the present disclosure will be appreciated when considered with reference to the following description of examples and accompanying figures. The following description does not limit the application; rather, the scope of the disclosure is defined by the appended claims and equivalents.

FIG. 1 presents a schematic diagram of an illustrative computer apparatus 100 for executing the techniques disclosed herein. Computer apparatus 100 may comprise any device capable of processing instructions and transmitting data to and from other computers, including a laptop, a full-sized personal computer, a high-end server, or a network computer lacking local storage capability. Computer apparatus 100 may include all the components normally used in connection with a computer. For example, it may have a keyboard and mouse and/or various other types of input devices such as pen-inputs, joysticks, buttons, touch screens, etc., as well as a display, which could include, for instance, a CRT, LCD, plasma screen monitor, TV, projector, etc. Computer apparatus 100 may also comprise a network interface 104 to communicate with other devices over a network.

In one example, computer apparatus 100 may also contain a processor 102, which may be any number of processors, such as processors from Intel® Corporation. In another example, processor 102 may be an application specific integrated circuit ("ASIC"). The computer 100 may include memory 106 which may be non-transitory computer readable medium ("CRM") to store instructions that may be retrieved and executed by processor 102. As will be discussed in more detail below, the instructions may include a latency manager 108. In another example, memory 106 may store data structures for storing data during the execution of instructions including the processing of latency manager.

In one example, memory 106 may include a quote cache 110, quote queue 111, quote version 112, configurable time period 114. In one example, computer 100 may use quote cache 110 to store quote data. In one example, computer 100 receive quote data from an external source and store the quote data to quote queue 111. The computer 100 may move quote data version from queue 111 to cache 110 when it receives new quote data. The computer 100 may use quote version 112 to store the latest version of the quote data. The computer 100 may use configurable time period 114 to store the time period used for removing quote data from quote cache 110.

In one example, memory 106 may be used by or in connection with any instruction execution system that can fetch or obtain the logic from the memory and execute the instructions contained therein. Non-transitory computer readable media may comprise any one of many physical media such as, for example, electronic, magnetic, optical, electromagnetic, or semiconductor media. More specific examples of suitable non-transitory computer-readable media include, but are not limited to, a portable magnetic computer diskette such as floppy diskettes or hard drives, a read-only memory ("ROM"), an erasable programmable read-only memory, a portable compact disc or other storage devices that may be coupled to computer apparatus 100 directly or indirectly. The memory (non-transitory CRM) 106 may also include any combination of one or more of the foregoing and/or other devices as well. While only one processor and one memory (non-transitory CRM) 106 are shown in FIG. 1, computer apparatus 100 may actually comprise additional processors and memories that may or may not be stored within the same physical housing or location.

In one example, computer apparatus 100 may also be interconnected to other computers via a network via a network interface 104, which may be a local area network ("LAN"), wide area network ("WAN"), the Internet, etc. The network and intervening nodes may also use various protocols including virtual private networks, local Ethernet networks, private networks using communication protocols proprietary to one or more companies, cellular and wireless networks, HTTP (The Hypertext Transfer Protocol), and various combinations of the foregoing. Although only a few computers are depicted herein it should be appreciated that a network may include additional interconnected computers. It should further be appreciated that computer 100 may be an individual node in a network containing a larger number of computers.

The computer apparatus 100 may include a messages section 116 which may reside in memory 106. In one example, messages 116 may include messages that computer 100 may transmit to a client computer over a network and messages which may be received by the computer over a network from the client computer. In one example, message 116 may include a quote request message 118 which may be used by an external client computer to transmit to computer 100 requests for quote data. In one example, messages 116 may include a quote tradable message 120 which may be used by computer 100 to transmit to client computer a stream of quote data versions or a stream of quote data with different identifiers. In one example, messages 116 may include a quote execute message 122 which may be used by an external client computer to transmit to computer 100 request to execute a trade on a quote data version. In one example, messages 116 may include a success message 124 which may be used by computer 100 to transmit to client computer a message indicating successful request of data or request to execute a trade of the quote data. In one example, messages 116 may include failure message 126 which may be used by computer 100 to transmit to a client computer a message indicating failure of a request of data or request to execute a trade of the quote data.

Although all the components of computer apparatus 100 are functionally illustrated as being within the same block, it will be understood that the components may or may not be stored within the same physical housing.

The latency management process 108 may comprise any set of instructions to be executed directly (such as machine code) or indirectly (such as scripts) by processor 102. In this regard, the terms "instructions," "scripts," or "modules" may be used interchangeably herein. The computer executable instructions may be stored in any computer language or format, such as in object code or modules of source code. Furthermore, it is understood that the instructions may be implemented in the form of hardware, software, or a combination of hardware and software and that the examples herein are merely illustrative.

In one example latency management processor or latency manager may provide techniques to help reduce latency and improve computer performance. These techniques may include, as described in further detail, managing latency between client computers over a network with server computers including determining a configurable time period, communicating quote data to client computers, determining most recent quote data from a cache and determining whether to execute quote data based on quote version data and time data associated with the quote data and based on the configurable time period.

Figure 2:
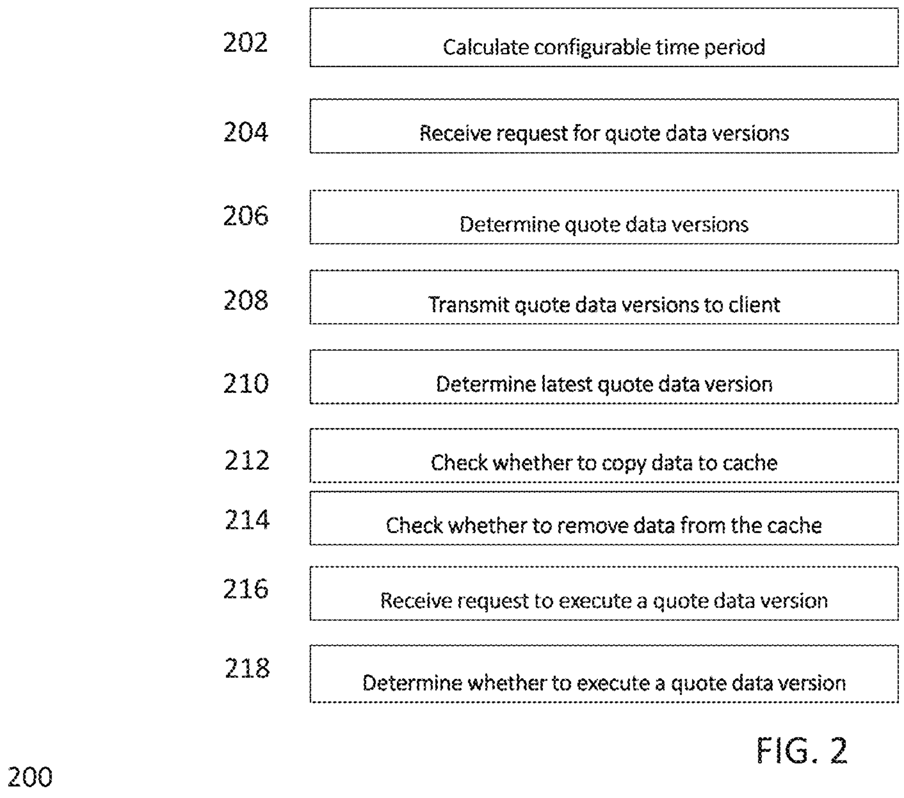
FIG. 2 is a flow diagram of an example method in accordance with aspects of the present disclosure.

FIG. 2 is a flow diagram of an example method 200 in accordance with aspects of the present disclosure.

In one example, processing may begin at block 202. At block 202, server 100 proceeds to calculate a configurable timeout period based on a time difference between transmission of a message to an external system and receipt of a response to the message from the external system. Processing proceeds to block 204.

At block 204, server 100 proceeds to receive, via the network interface, from a client computer, a quote request message to request to receive a stream of quote data versions related to a financial instrument. Processing proceeds to block 206.

At block 206, server 100 proceeds to determine a stream of quote data versions based on updates from quote data sources. Processing proceeds to block 208.

At block 208, server 100 proceeds to transmit, via the network interface, to the client computer a quote tradable message that includes the stream of quote data versions which are obtained from the quote queue. Processing proceeds to block 210.

At block 210, server 100 proceeds to determine a latest queue version from the plurality of quote data versions which is based on a most recently received quote data version compared to an earlier received quote data version. Processing proceeds to block 212.

At block 212, server 100 proceeds to determine whether to copy the latest quote data version to the quote cache. Processing proceeds to block 214.

At block 214, server 100 proceeds to periodically check the quote cache to determine whether to remove a quote data version from the quote cache. Processing proceeds to block 216.

At block 216, server 100 proceeds to receive, via the network interface, from the client computer, a quote execute message indicating a request to execute a requested quote data version selected from the stream of quote data versions. Processing proceeds to block 218.

At block 218, server 100 proceeds to determine whether to execute the requested quote data version based on whether the requested quote data version matches the latest quote version. In addition, server 100 proceeds to determine whether to execute the requested quote data version based on (a) whether the requested quote data version is present in the quote cache and (b) whether a time age of the requested quote data version is less than the configurable time period.

In another example, server 100 determines the time age is calculated based on a difference between a system time stamp of the client request and a time stamp of the requested quote data version when placed in the quote cache. In another example, server 100 determines to remove the quote data version from the quote cache based on a time age of the quote data version is greater than the configurable time period. In another example, server 100 determines to storing quote data versions to a quote queue and then copying the quote date versions to the quote cache and transmitting to the client computer the quote date versions. In another example, server 100 determines to exchange messages with a client computer comprises exchanging messages through a platform computer. In another example, server 100 determines transmission of responses to the client computer comprises transmission of messages to cause to interact with the network interface of the apparatus and a network interface associated with the client computer to cause display of the plurality of quote data on a graphical user interface of the client computer.

In another example, the present disclosure provides an apparatus and a non-transitory computer-readable media, having stored thereon instructions that, when executed by a processor, cause the processor to implement the method implemented by the apparatus features or claims.

Figure 3:
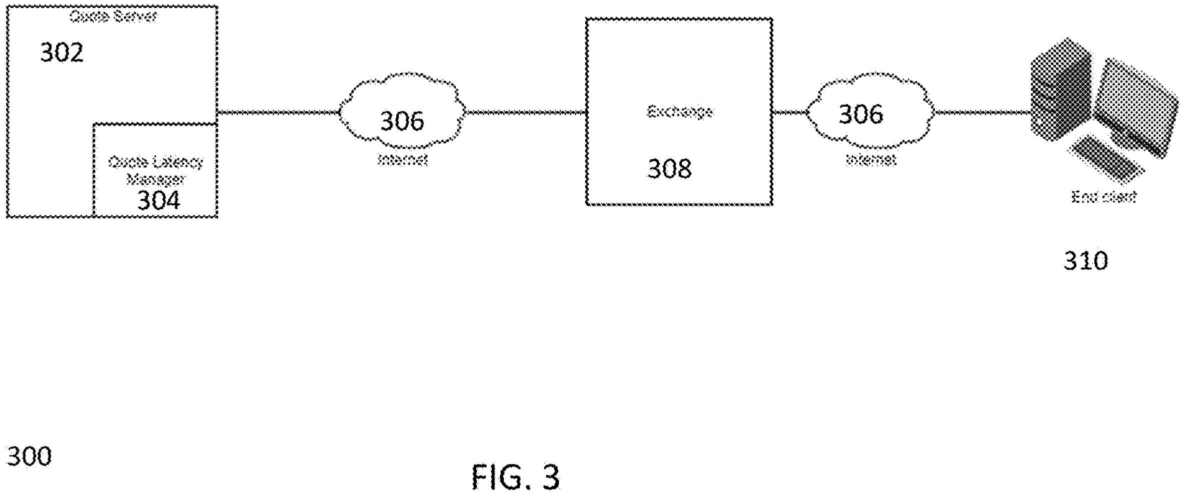
FIG. 3 is another example system in accordance with aspects of the present disclosure.

FIG. 3 is another example system in accordance with aspects of the present disclosure. In one example, system 300 include a server computer 302 which communicates over computer networks 306 to connect client computer 310 through electronic platform computer 310. The client computer 310 may request quote data from server computer 302 through electronic platform computer 308 for review and subsequent execution. In one example, such computer systems and networks may help reduce latency. In one example, platform 308 may be an intermediate computer so to provide client computer 310 with a single interface to a plurality of data sources. In one example, network 306 may be any means for electronic communication networking such as the Internet. The server computer 302 may be any computer for providing quote data related to a financial instrument such as options. In one example, server 302 may include quote latency manager 304 to provide latency management techniques. The techniques may help reduce latency and improve computer performance which includes managing latency between client computers 310 over network 306 with server computers 302 In one example, quote latency manager 304 may include functionality for determining configurable time period, communicating quote data to client computers, determining most recent quote data from a cache and determining whether to execute quote data based on quote version data and time data associated with the quote data and based on the configurable time period.

In example, client computer 310 may include a GUI to allow a user to process (generate and receive) messages and to communicate with an API (application program interface) to communicate with a network interface over network 306 and to server computer 302. In one example, in a similar manner, server computer 302 may include a GUI to allow a user to process messages (generate and receive) and to communicate with an API to communicate with a network interface over network 306 and to client computer 312. In one example, messages between server computer 302 and client computer 312 flow through exchange platform 310 over computer network 306. In one example, the techniques may help reduce latency and improve computer performance which includes managing latency between client computers 310 over network 306 with server computers 302.

Figure 4:
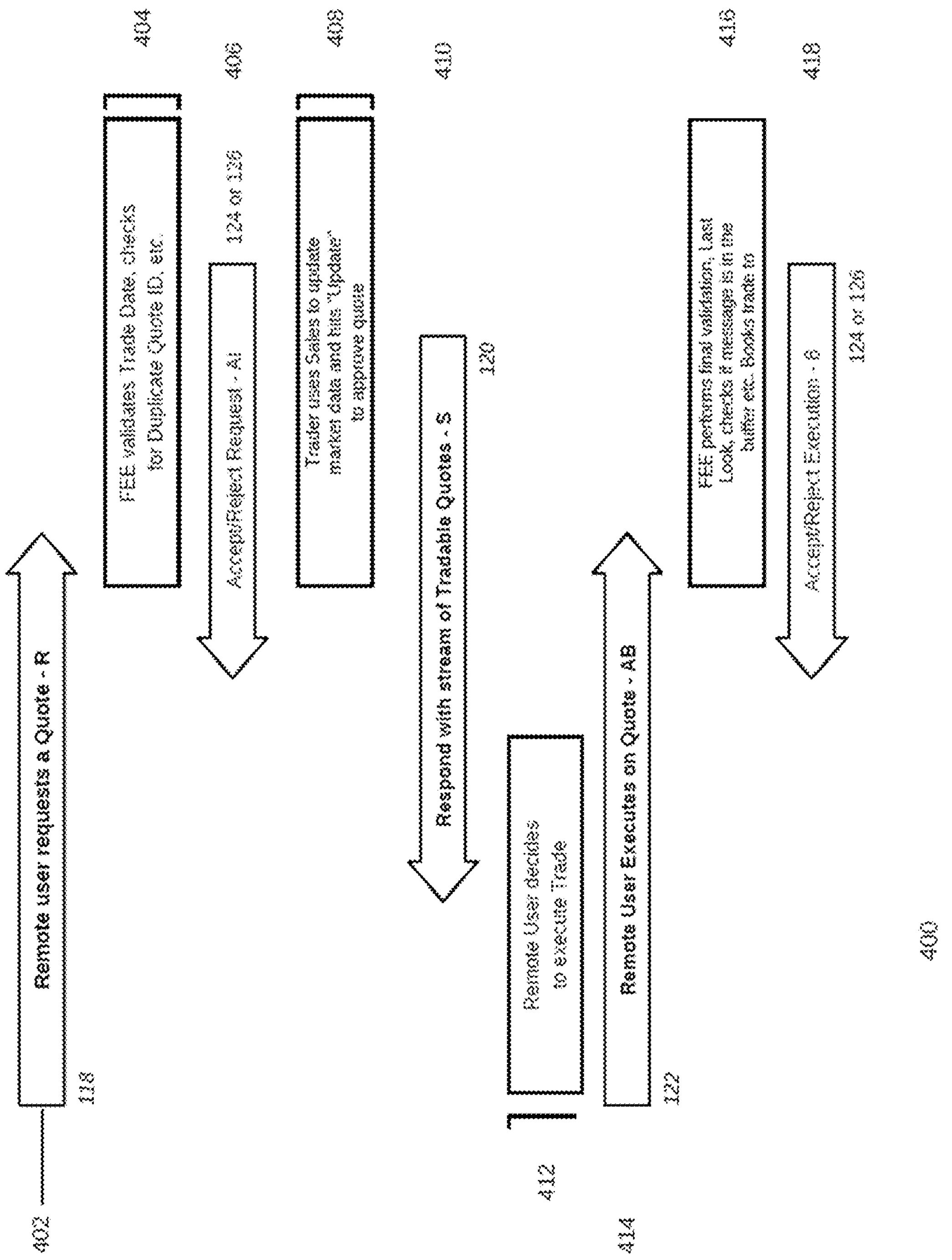
FIG. 4 is another example flow diagram in accordance with aspects of the present disclosure.

FIG. 4 is another example flow diagram in accordance with aspects of the present disclosure. In one example, flow diagram 400 illustrates the flow of messages (message 116) between client computer 310 (e.g., remote user or end client) and server computer 302 (e.g., quote server) over computer network 306 and through electronic platform computer 308.

The client computer 310 may request data from server computer 302 through electronic platform computer for review and subsequent execution. In one example, such computer systems and networks may help control or reduce latency by executing quote latency management functionality 304. In one example, the techniques may help reduce latency and improve computer performance which includes managing latency between client computers 310 over network 306 with server computers 302 In one example, quote latency manager 304 may include functionality for determining configurable time period, communicating quote data to client computers, determining most recent quote data from a cache and determining whether to execute quote data based on quote version data and time data associated with the quote data and based on the configurable time period. In one example, processing may begin at block 402.

At block 402, client computer 310 may send a message or command (quote request message 118) to server computer 302 to request for quotes (labeled R). In one example, client computer 310 may include a GUI to allow a user to process (generate and receive) messages and include an API (application program interface) to allow the computer to communicate with a network interface over network 306 and to server computer 302. In one example, in a similar manner, server computer 302 may include a GUI to allow a user to process messages (generate and receive) and include an API to allow the computer to communicate with a network interface over network 306 and client computer 310. Processing may proceed to block 404.

At block 404, server computer 302 may perform various functions and processes in response to the request for quotes (quote request message 118). For example, server computer 302 may validate trade data associated with the requested quote, check for duplication quote identifier and the like. Processing may proceed to block 406.

At block 406, server computer 302 may send messages to client computer 312. In one example, server computer 302 may send an accept message indicating that the request for the quote (quote request message 118) was approved or accepted. In another example, server computer 302 may send a reject message indicating that the request for the quote (quote request message 118) was rejected for various reasons including whether the quote was no longer valid or available for execution or trade. Processing may proceed to block 408.

At block 408, server computer 302 may continue to process the request for quote (quote request message 118). In one example, if the request for quote was accepted, server computer 302 may communicate with a trader, such as a trade system, which may use sales data to update market data and generate (hits) an “Update” command or message to approve the request for quote (quote request message 118). Processing may proceed to block 410.

At block 410, server computer 302 continues to process the request for quote (quote message). In one example, if the request for quote was accepted, server computer 302 may respond by generating a message, directed to client computer 310. The message may include a stream or plurality of tradable quotes (quote tradable message 120) in response to the accepted request for quote from client computer 310. Processing may proceed to block 412.

At block 412, client computer 310 may process the stream of tradeable quotes (quote tradable message 120) from server computer 302. In one example, client computer 310 may display on a GUI of the client computer the stream of tradeable quotes (tradable quote message 120). In response, a user of the client computer 312 may respond to the displayed tradable quotes (tradable quote message 120) by selecting a particular quote for execution. Processing may proceed to block 414.

At block 414, client computer 310 may send a message to server computer 302 that includes a request to execute the selected tradable quote (quote execute message 122). Processing may proceed to block 416.

At block 416, server computer 302 may process the request to execute (quote execute message 122) the selected tradable quote received from client computer 310 at block 414. In one example, server computer 302 may execute latency management functionality to process the request to execute (quote execute message 122). In one example, server computer 302 may perform various functions such as performing final validation on the quote identified in the execute quote message, perform a last look on the quote identified in execute quote message, check if the quote identified in the execute quote message is in the quote queue (buffer), and whether to execute a trade on the quote (book the trade). In one example, server 302 may execute latency manger process 304 to determine whether it can execute the requested trade. Processing may proceed to block 418.

At block 418, server computer 302 may perform various functions and processes in response to the request to execute the selected quote (execute quote message). In one example, server 302 may execute latency manger process 304 to determine whether it can execute the requested trade. In one example, if successful, server computer 302 may send an accept execution message (success message 124) indicating that the request to execute the quote was executed successfully. In another example, if not successful, server computer 302 may send a reject execution message (failure message 126) indicating that the request to execute the quote was rejected for various reasons including whether the tradable quote was no longer valid or available for execution or trade.

In one example, server 302 may execute latency manager 304 which has functionally to determine whether to replace a quote with a previous quote. In one example, latency manager 304 may add the previous quote to the quote cache (buffer) for the time indicated by a configurable time period (latencybuffer). The configurable time period (latency buffer) time may start when the quote is replaced by a new quote, is canceled or expires. In one example the time period does not start when the original quote is sent.

In one example, these techniques may help reduce latency and improve computer performance which includes managing latency between client computers 310 over network 306 with server computers 302.

Figure 5A:
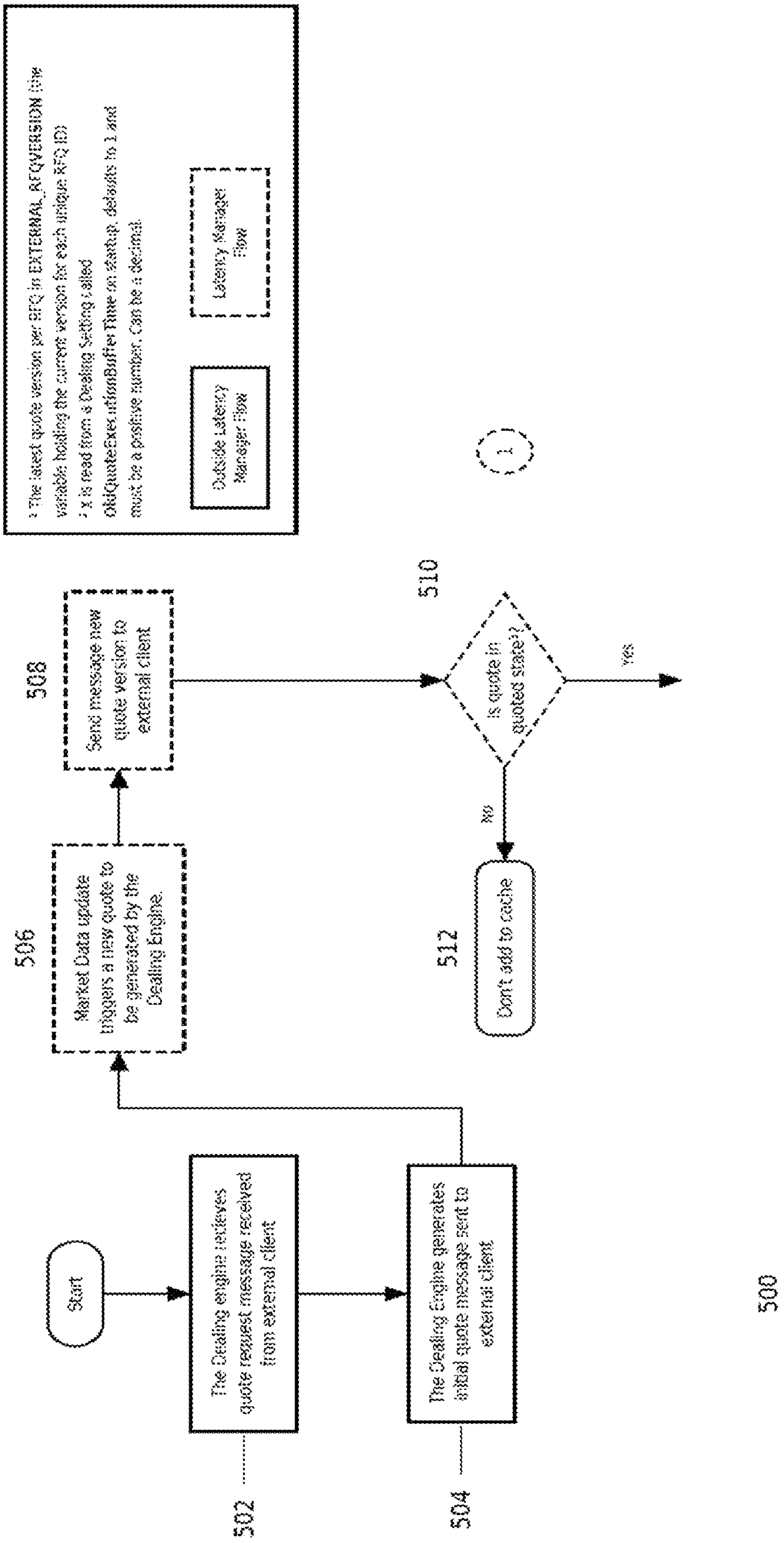
FIGS. 5A and 5B are another example flow diagram in accordance with aspects of the present disclosure.
Figure 5B:
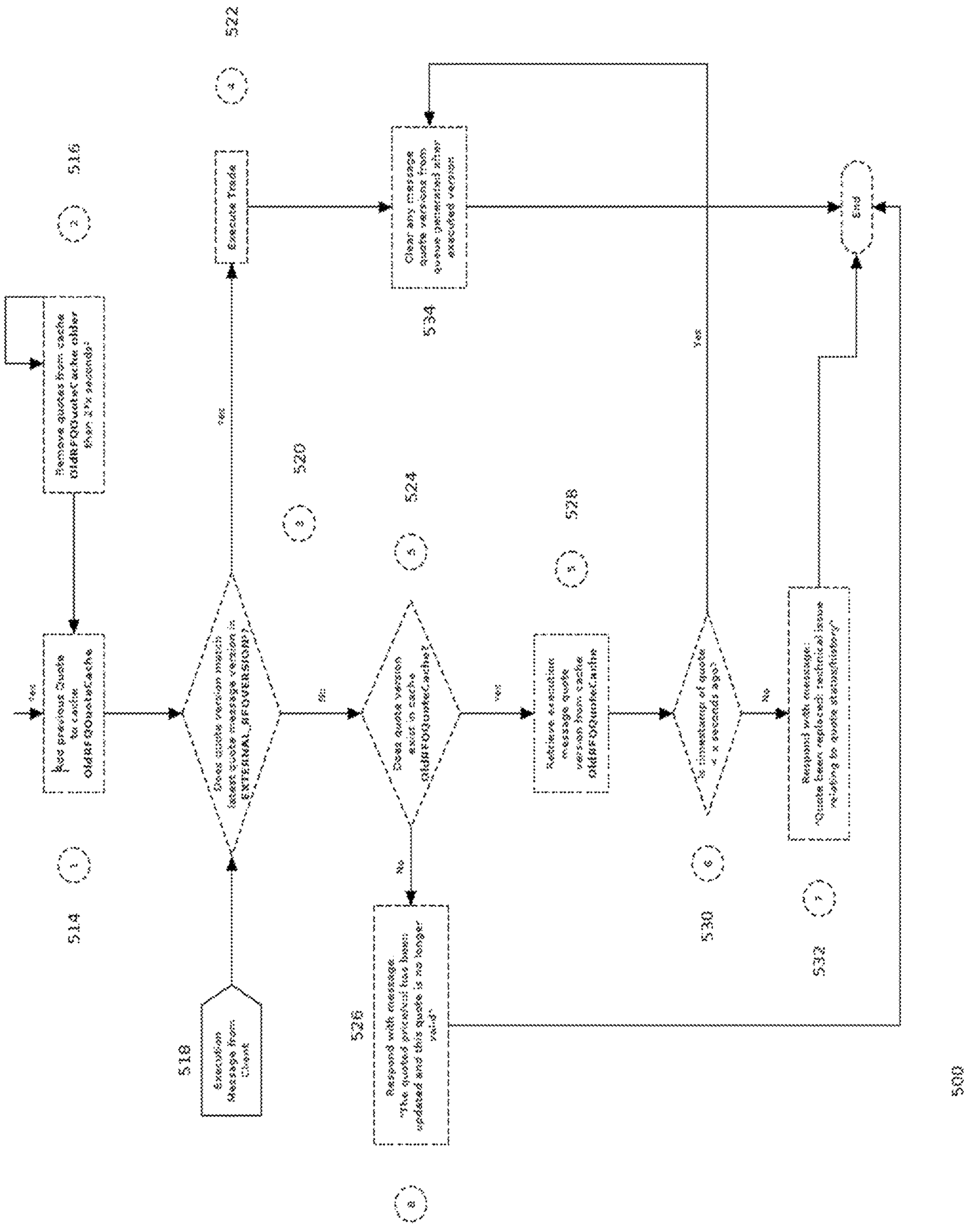

FIGS. 5A and 5B are another example flow diagram in accordance with aspects of the present disclosure. In one example, block 500 illustrates an embodiment of latency manager functionality. In one example, the latency manager process 500 may provide latency management techniques with advanced version checking to help ensure that requests to execute quotes or trades on quotes do not fail due to network latency between parties. In one example, flow diagram 500 illustrates the flow of messages 116 between client computer 310 (e.g., remote user or end client) and server computer 302 (e.g., quote server) over computer network 306 through electronic platform computer 310. The client computer 310 may request data from server computer 302 through electronic platform computer for review and subsequent execution. In one example, such computer systems and networks may help manage, control and/or reduce latency by executing quote latency management functionality 304.

In one example, communication between server computer 302 and client computer may occur through electronic exchange platform 308. In one example, platform 308 may provide client computer 310 with access to a plurality of different electronic data sources that provide different quote data. In one example, platform 308 provides client 310 with the ability to view the data from different data sources onto a single interface which may include a GUI.

In one example, server computer 302 may include a dealing engine to interact with other sources of quote data and to receive updates to the quote data. In one example, the dealing engine may include functionality to receive requests from client 310 and then in turn interact with data sources to obtain the requested quote data. The dealing engine may include functionality to provide for calculating updated quote data and for generating a stream of quote data when it then transmits to the client computer.

In one example, server computer 302 may provide for a history of quote versions which be kept or maintained in memory as quote cache 110 in order to help improve performance. In one example, server computer 312 may process quote data (quote versions) by removing quote versions from quote cache 110 (OldRFQQuoteCache) after a configurable time period 114 has elapsed. In one example, configurable time period 114 may be calculated based on a factor multiplied by a time period such as 2 (factor) multiplied by x seconds. In one example, configurable time period 114 may be based a time period read or received from a setting on a startup value (OldQuoteExecutionBufferTime) from server computer 302. In one example, configurable time period 114(*x*) may be set to a default value of 1 second. In one example, configurable time period 114 may be a positive number and may be a decimal value such as 0.12. In one example, sever computer 302 provides for latency management by providing for a memory buffer which may be based on a time factor multiplied by configurable time period 114 (e.g., 2*x) which may allow the system to provide more informative message regarding quote versions that may have passed beyond the configurable time period 114 (OldQuoteExecutionBufferTime). In one example, the time factor and configurable time period 114 may be dynamically adjustable based on real time network latency measurements.

In one example, process 500 may begin processing at block 502. The server 302 (Dealing Engine) may receive a message or request that includes a quote request message 118 from an external client such as client 310. In one example, server computer 302 may include a dealing engine to interact with other sources of quote data and to receive updates to the quote data. In one example, the dealing engine may include functionality to receive requests from client 310 and then in turn interact with data sources to obtain the requested quote data. The dealing engine may include functionality to provide for calculating updated quote data and for generating a stream of quote data when it then transmits to the client computer.

At block 504, server 302 may then generate an initial quote message (quote tradable message 120) and send the message to requesting client 310. In one example, server computer 302 may include a dealing engine to interact with other sources of quote data and to receive updates to the quote data. In one example, the dealing engine may include functionality to receive requests from client 310 and then in turn interact with data sources to obtain the requested quote data. The dealing engine may include functionality to provide for calculating updated quote data and for generating a stream of quote data when it then transmits to the client computer.

At block 506, server 302 may receive market data updates. In one example, server computer 302 may include a dealing engine to interact with other sources of quote data and to receive updates to the quote data. In one example, the dealing engine may include functionality to receive requests from client 310 and then in turn interact with data sources to obtain the requested quote data. The dealing engine may include functionality to provide for calculating updated quote data and for generating a stream of quote data when it then transmits to the client computer.

At block 508, in response to such updates at block 506, server 302 (Dealing Engine) may generate and send quote update messages (quote tradable message 120) to external clients such as client 310. When the new quote update message is generated, server 302 (Dealing Engine) assigns a new quote version identifier (QuoteID) to the quote data, which uniquely identifies the quote version. The newest quote version identifier (QuoteID) replaces in quote version 112 (EXTERNAL_RFQVERSION) the previous quote version identifier QuoteID. In one example, quote version 112 (EXTERNAL_RFQVERSION) represents a variable for holding the current version quote. In one example, server computer 302 may include a dealing engine to interact with other sources of quote data and to receive updates to the quote data. In one example, the dealing engine may include functionality to receive requests from client 310 and then in turn interact with data sources to obtain the requested quote data. The dealing engine may include functionality to provide for calculating updated quote data and for generating a stream of quote data when it then transmits to the client computer.

In one example, blocks 502, 504, 506, 508 represent functions performed by server 302 which may be implemented by the dealing engine outside the latency manager flow process. In another example, the remaining blocks below may represent functions performed by server 302 which may be implemented as part of the latency manager flow process. In another example, different blocks may be implemented the latency manager, dealing engine or a combination thereof.

At block 510, server 302 checks version data of quote data (quote version 112). If server 302 determines that the previous quote version (QuoteID) (quote version 112) still is in a “quoted” state, then processing proceeds to block 514 wherein latency manager process (308) may store the previous QuoteID in quote cache 110 (OldRFQQuoteCache). On the other hand, if server 302 determines that the previous QuoteID (quote version 112) is not in a “quoted” state, server 302 does not add the quote to the cache as indicated at block 512 (step 1).

At block 516, server 302 periodically checks status of quote cache 110 (OldRFQQuoteCache). If server 302 determines that quote version (quote version 112) of quote data in quote cache 112 (OldRFQQuoteCache) is older than a factor multiplied by configurable time period (2*x seconds), then server 302 removes the old quote from quote cache 110 (OldRFQQuoteCache). In one example, server may periodically check the quote cache to determine whether to remove a quote data version from the quote cache. In one example, server removes the quote data version from the quote cache based on a time age of the quote data version is greater than 2 times the configurable time period. In one example, the time age is calculated based on a difference between a current system time and a time stamp of the requested quote data version when placed in the quote cache.

At block 518, server 302 receives a request to execute quote message (Quote execute message 118) from client 312. In one example, communication between server computer 302 and client computer may occur through electronic exchange platform 308.

At block 520, server 302 checks quote version data (quote version 112). If server 302 determines that quote version (QuoteID) from the execute quote message 122 matches the QuoteID in quote version 112 (EXTERNAL_RFQVERSION) (the variable holding the current version), and current QuoteID is in a "quoted" state, then server 302 (Dealing Engine executes the trade using the current QuoteID, as indicated at block 522 (steps 3,4). On the other hand, if server 302 determines that there is no match, then processing proceeds to block 524.

At block 524, server 302 checks whether quote version 112 (EXTERNAL_RFQVERSION) of the quote data exists in quote cache 110. On the one hand, if server 302 determines that the quote version QuoteID from execution message (quote execute message 122) does not match the QuoteID in quote version 112 (EXTERNAL_RFQVERSION), then server 302 proceeds to check if the execution message QuoteID quote is in the Latency Manger quote cache 110 (OldRFQQuoteCache), as indicated at block 528 (step 5). On the other hand, if server 302 determines that execution message QuoteID is not found in quote cache 110 (OldRFQQuoteCache), then server 302 responds with a failure message 126 indicating failed transaction, as indicated at block 526 (step 8). In one example, the message may indicate an error message or unsuccessful message such as follows: "The quoted price/vol has been updated and this quote is no longer valid"

At block 530, server 302 checks timestamp of quote data. On the one hand, if server 302 determines that QuoteID from the execution message (quote execute message 122) is found in quote cache 110 (OldRFQQuoteCache) and has a timestamp that is less than the configurable time period (x seconds ago), then server 302 (Dealing Engine) executes the trade using this QuoteID as indicated at block 522 (steps 4,6). In one example, server 302 determines whether to execute the requested quote data version based on (a) whether the requested quote data version is present in the quote cache and (b) whether a time age of the requested quote data version is less than the configurable time period. In one example, server 302 calculates the time age based on a difference between a current system time and a time stamp of the requested quote data version when placed in the quote cache.

On the other hand, if server 302 determines that execution message QuoteID is found in quote cache 110 (OldRFQQuoteCache) but is older than the configurable time period (x seconds), then server 302 (Dealing Engine) responds with a failure message indicating a failed transaction as indicate at block 532 (step 7). In one example, the failure message may indicate a message as follows: "Quote been replaced: technical issue relating to quote status/history".

At block 534, when 302 server executes a trade at block 522, the server process to clear all versions of the executed quote from the quote version 112 (EXTERNAL_RFQVERSION) and quote cache 110 (OldRFQQuoteCache).

In one example, server 302 may execute a trade even if the current QuoteID in quote version 112 (EXTERNAL_RFQVERSION) is not in a "quoted" state. In one example, server 302 may maintain state information of quote data such as "quoted" state. In one example, server 302 may determine whether a trade request can be executed by checking that state of a previous quote version being stored in the quote cache 110 (OldRFQQuoteCache), In other example, server 302 may maintain state information of quote data such as Requested, Pending execution, Pulled, Cancelled, Ticketed, Rejected, Executed and Expired. In one example, the Quoted state indicates: Trade that has been quoted to requesting entity and a time window within which the quotes can be executed. In one example, the Requested state indicates: Requested-Trade that has been requested for a quote. In one example, the Pending execution state indicates: Trade waiting for confirmation from counterparty that trade has been booked on their side. In one example, the Pulled state indicates: Quote that has been pulled and a new quote will be sent at a later point in time. In one example, the Cancelled state indicates: The dealing request was not booked because the user cancelled a live quote. In one example, the Ticketed state indicates: Trade that has been ticketed. In one example, the Rejected state indicates: Request has been rejected by trader. In one example, the Executed state indicates: The dealing request has been booked. In one example, the Expired state indicates: Quote has expired.

FIG. 6 is an example time line diagram 600 in accordance with aspects of the present disclosure. In one example, block 600 represents a table that illustrates execution of the latency process in accordance with an example of the present disclosure. In one example, table 600 assumes that pre-latency manager flow has been enacted and that all quotes are in quoted state. The table 600 contains several columns representing a time sequence of states of operations of the latency manager starting from a time of 13:10:00 extending to a time of 13:10:16 wherein the time is represented as hours: minutes: seconds. In addition, table 600 provides several rows describing the different states or status of the latency manager and related data structures (quote cache 110, quote queue 11, quote version 112, configurable time period 114, messages 116) for each column for the time sequence of the latency manager process. In this case, in one example, server 302 sets configurable time period (OldQuoteExecutionBufferTime) to a value of 3 seconds. In addition, server 302 uses system time to determine the current time as indicated below such as 13:10:00, 13:10:02, 13:10:04, 13:10:06, 13:10:07, 13:10:08, 13:10:10, 13:10:12, 13:10:14, 13:10:16. It should be understood that this is an example to illustrate operation in one example and that other examples are applicable to practice the techniques of the present disclosure.

The Process May Begin at Time 13:10:00.

In this case, server 302 generates a QuoteID such as ABC-0-T. In one example, server 302 may generate QuoteID ABC-0-T based on information such as market data from external sources, internal sources or a combination of sources. In one example, server computer 302 may provide a dealing engine to provide a source of data and updates to the data. In one example, server 302 assigns the identifier "ABC" to represent a unique identifier for the quote. The server 302 assigns "0" as a quote version to the quote ABC.

As explained below, the quote version is increased by "1" each time the quote is updated based on information such as market data. The server 302 assigns an identifier "T" to the quote ABC to represent the direction of the execution of the quote. In one example, the identifier "T" represents a quote as a trade as is and the identifier "O" represents a quote as a trade as opposite.

In one example, server 302 stores the quote with a QuoteID of ABC-0-T in quote queue 111 for subsequent processing. In one example, the quote in quote queue 111 may represent a quote that is in immediate memory before it is moved to quote cache 110. In one example, the latest message (quote) in quote queue 111 will have the same version number as in quote version 112 EXTERNAL_RFQ-VERSION.

In one example, server 302 sends to client 310 a quote tradeable message 120 indicating the latest quote of QuoteID of ABC-0-T.

In this case, server 302 sets quote version 112 (EXTERNAL_RFQVERSION) to a value of "0" since this is the initial or first version of the quote.

In one example, server 302 does not store the quote with a QuoteID of ABC-0-T to quote cache 110.

In one example, server 302 checks that quote cache 110 is empty so it is not necessary to remove any quotes from the cache.

At time 13:10:02, server 302 determines that there is an update to quote ABC represented by a change from ABC-0-T to ABC-1-T.

In one example, server 302 stores the new or updated quote with a QuoteID of ABC-1-T to quote queue 111 for subsequent processing. In one example, the quote in quote queue 111 may represent a quote that is in immediate memory before it is moved to quote cache 110. In one example, the latest message (quote) in quote queue 111 will have the same version number as in quote version 112 EXTERNAL_RFQVERSION.

In one example, server 302 sends to client 310 a quote tradeable message 120 indicating the latest quote of QuoteID of ABC-1-T.

In one example, server 302 updates quote version 112 (EXTERNAL_RFQVERSION) by "1" since there has been an update to the quote data, which is the latest version having the latest price and the like.

In one example, server 302 stores the previous quote with a QuoteID of ABC-0-T from quote queue 111 to quote cache 110, after confirming that it is still in a "quoted" state, and then timestamps it as 13:10:02, the time at which it is was added to the cache.

In one example, server 302 checks the age of any quotes stored in quote cache 110 and removes any of the quotes that are older than 2 times the configurable time period 114. In this case, server 302 checks the cache timestamp of QuoteID of ABC-0-T stored in quote cache 110 and determines that the timestamp has a value of 13:10:02. The server 302 compares the timestamp value of 13:10:02 to the current system time of 13:10:02 and determines that the difference is less than 6 seconds, which is 2 times the configurable time period 114 (OldQuoteExecutionTimeBuffer) of 3 seconds. In this case, server 302 does not remove QuoteID of ABC-0-T from quote cache 110.

At time 13:10:04, server 302 determines that there is another update to quote ABC represented by a change from ABC-1-T to ABC-2-T.

In one example, server 302 stores the new or updated quote QuoteID of ABC-2-T to quote queue 111 for subsequent processing. In one example, the quote in quote queue 111 may represent a quote that is in immediate memory before it is moved to quote cache 110. In one example, the latest message (quote) in quote queue 111 will have the same version number as in quote version 112 EXTERNAL_RFQ-VERSION.

In this case, server 302 sends to client 310 a quote tradeable message 120 indicating the latest quote of QuoteID of ABC-2-T.

In one example, server 302 sets quote version 112 (EXTERNAL_RFQVERSION) to a value of "2" since this an updated and the latest version of the quote.

In this case, server 302 stores the previous quote with a QuoteID of ABC-1-T from quote queue 111 to quote cache 110 and then timestamps it as 13:10:04, the time at which it is was added to the cache.

In one example, server 302 checks the cache timestamp of QuoteID of ABC-0-T and ABC-1-T stored in quote cache 110 and determines that their timestamps have a values of 13:10:02 and 13:10:04, respectively, which are the times that the quotes were updated and stored in quote cache 110. The server 302 compares the timestamp values of 13:10:02 and 13:10:04 to the current system time of 13:10:04 and determines that the differences are less than 6 seconds, which is 2 times the configurable time period 114 (OldQuoteExecutionTimeBuffer) of 3 seconds. In this case, server 302 does not remove QuoteID ABC-0-T or ABC-1-T from quote cache 110.

At time 13:10:05, server 302 determines that there is an update to quote ABC represented by a change from ABC-2-T to ABC-3-T.

In one example, server 302 stores the new or updated quote QuoteID of ABC-3-T to quote queue 111 for subsequent processing. In one example, the quote in quote queue 111 may represent a quote that is in immediate memory before it is moved to quote cache 110. In one example, the latest message (quote) in quote queue 111 will have the same version number as in quote version 112 EXTERNAL_RFQ-VERSION.

In one example, server 302 sends to client 310 a quote tradeable message 120 indicating the latest quote of QuoteID of ABC-3-T.

In one example, server 302 updates quote version by "3" since there has been an update to the quote data such as price and the like.

In one example, server 302 sets quote version 112 (EXTERNAL_RFQVERSION) to a value of "3" since this is an updated and the latest version of the quote.

In one example, server 302 stores the previous quote with a QuoteID of ABC-2-T from quote queue 111 to quote cache 110, and then timestamps it as 13:10:05, the time at which it is was added to the cache.

In one example, server 302 checks the cache timestamp of QuoteID of ABC-0-T, ABC-1-T and ABC-2-T stored in quote cache 110 and determines that their timestamps have a values of 13:10:02, 13:10:04 and 13:10:05, respectively, which are the times that the quotes were updated and stored in quote cache 110. The server 302 compares the timestamp values of 13:10:02, 13:10:04 and 13:10:05 to the current system time of 13:10:05 and determines that the differences are less than 6 seconds, which is 2 times the configurable time period 114 (OldQuoteExecutionTimeBuffer) of 3 seconds. In this case, server 302 does not remove QuoteID ABC-0-T, ABC-1-T or ABC-2-T from quote cache 110.

In this case, server 302 receives from client 310 a quote execute message 122 to execute quote ABC-0-T.

In one example, server 302 determines that quote version ("0") of quote QuoteID of ABC-0-T does not match quote version 112 (EXTERNAL_RFQVERSION) which is set to value of "3".

In one example, server 302 does not execute the requested quote because of the mismatch between versions.

In one example, server 302 checks if quote version ABC-0-T is in quote cache 110 and checks that the difference between its cache timestamp less and the system time is less than the configurable time period 114 (OldQuoteExecutionTimeBuffer) of 3 seconds. In one example, server 302 compares QuoteID ABC-0-T's timestamp value of 13:10:02 to the current system time of 13:10:05 and determines that the difference is not less than 3 seconds.

In this case, server 302 takes the action of sending to client 310 a failure message 126 indicating that the request to execute the trade was unsuccessful. In one example, the failure message can include text such as "quote has been replaced: technical issue relating to quote/status history".

At time 13:10:07, server 302 determines that there is an update to quote ABC represented by a change from ABC-3-T to ABC-4-T.

In one example, server 302 stores the new or updated quote QuoteID of ABC-4-T to quote queue 111 for subsequent processing. In one example, the quote in quote queue 111 may represent a quote that is in immediate memory before it is moved to quote cache 110. In one example, the latest message (quote) in quote queue 111 will have the same version number as in quote version 112 EXTERNAL_RFQVERSION.

In one example, server 302 updates quote version by "4" since there has been an update to the quote data such as price and the like.

In one example, for quote with a QuoteID of ABC-4-T, server 302 sets quote version 112 (EXTERNAL_RFQVERSION) to a value of "4" since this an updated and the latest version of the quote.

In one example, server 302 sends to client 310 a quote tradeable message 120 indicating the latest quote of QuoteID of ABC-4-T.

In one example, server 302 stores the previous quote with a QuoteID of ABC-3-T from quote queue 111 to quote cache 110.

In one example, server 302 checks the cache timestamp of QuoteID of ABC-0-T, ABC-1-T, ABC-2-T and ABC-3-T stored in quote cache 110 and determines that their timestamps have a values of 13:10:02, 13:10:04, 13:10:05 and 13:10:07, respectively, which are the times that the quotes were updated and stored in quote cache 110. The server 302 compares the timestamp values of 13:10:02, 13:10:04, 13:10:05 and 13:10:07 to the current system time of 13:10:07 and determines that the differences are less than 6 seconds, which 2 times the configurable time period 114 (OldQuoteExecutionTimeBuffer) of 3 seconds. In this case, server 302 does not remove QuoteID ABC-0-T, ABC-1-T, ABC-2-T or ABC-3-T from quote cache 110.

At time 13:10:08, in one example, server 302 checks the cache timestamp of QuoteID of ABC-0-T, ABC-1-T, ABC-2-T and ABC-3-T stored in quote cache 110 and determines that their timestamps have a values of 13:10:02, 13:10:04, 13:10:05 and 13:10:07, respectively, which are the times that the quotes were updated and stored in quote cache 110. The server 302 compares the timestamp values of 13:10:02, 13:10:04, 13:10:05 and 13:10:07 to the current system time of 13:10:08 and determines that the difference for ABC-0-T is equal to 6 seconds, but differences for ABC-1-T, ABC-2-T and ABC-3-T are less than 6 seconds, which is 2 times the configurable time period 114 (OldQuoteExecutionTimeBuffer) of 3 seconds. In this case, server 302 removes QuoteID ABC-0-T from quote cache 110. In this case, server 302 does not remove QuoteID ABC-1-T, ABC-2-T or ABC-3-T from quote cache 110.

In one example, server 302 receives from client 310 a quote execute message 122 to execute quote ABC-3-T.

In one example, server 302 determines that quote version ("3") of QuoteID of ABC-3-T does not match quote version 112 (EXTERNAL_RFQVERSION) which is set to value of "4"

In one example, server 302 does not execute the requested quote because of the mismatch between versions.

In one example, server 302 checks if quote version ABC-3-T is in quote cache 110 and checks that the difference between its cache timestamp less and the system time is less than the configurable time period 114 (OldQuoteExecutionTimeBuffer) of 3 seconds. In one example, server 302 compares QuoteID ABC-3-T's timestamp value of 13:10:07 to the current system time of 13:10:08 and determines that the difference is less than 3 seconds.

In one example, server 302 takes the action of executing a trade ABC-3-T and sending to client 310 a success message 124 with a message indicating that the request to execute the traded for the requested quote was successful. In this case, the success message can include a text message such as "The quoted price/volume has been executed".

In one example, server 302 removes from the cache all versions of quote ABC.

At time 13:10:10, server 302 determines that there are no updates to any quotes.

At time 13:10:12, server 302 determines that there is an update to quote XYZ.

In one example, server 302 stores the current quote with a QuoteID of XYZ-0-T to quote queue 111 for subsequent processing. In one example, the quote in quote queue 111 may represent a quote that is in immediate memory before it is moved to quote cache 110. In one example, the latest message (quote) in quote queue 111 will have the same version number as in quote version 112 EXTERNAL_RFQVERSION.

In one example, server 302 sends to client 310 a quote tradeable message 120 indicating the latest quote of QuoteID of XYZ-0-T.

In one example, server 302 sets quote version 112 (EXTERNAL_RFQVERSION) to a value of "0" since this is the first version of the quote.

In one example, server 302 does not yet store the quote with a QuoteID of XYZ-0-T to quote cache 110.

At time 13:10:14, server 302 determines that there is an update to quote XYZ represented by a change from XYZ-0-T to XYZ-1-T.

In one example, server 302 stores the current quote with a QuoteID of XYZ-1-T to quote queue 111 for subsequent processing. In one example, the quote in quote queue 111 may represent a quote that is in immediate memory before it is moved to quote cache 110. In one example, the latest message (quote) in quote queue 111 will have the same version number as in quote version 112 EXTERNAL_RFQVERSION.

In one example, server 302 sends to client 310 a quote tradeable message 120 indicating the latest quote of QuoteID of XYZ-1-T.

In one example, server 302 updates quote version by "1" since there has been an update to the quote data such as price and the like.

In one example, server 302 sets quote version 112 (EXTERNAL_RFQVERSION) to a value of "1" since this an updated and the latest version of the quote.

In this case, server 302 stores the previous quote with a QuoteID of XYZ-0-T from quote queue 111 to quote cache 110.

At time 13:10:16 server 302 checks the age of any quotes stored in quote cache 110 and removes any of the quotes that are older than 2 times the configurable time period 114. In this case, server 302 checks the cache timestamp of QuoteID of XYZ-0-T stored in quote cache 110 and determines that the timestamp has a value of 13:10:14. The server 302 compares the timestamp value of 13:10:14 to the current system time of 13:10:16 and determines that the difference is less than 6 seconds, which is 2 times the configurable time period 114 (OldQuoteExecutionTimeBuffer) of 3 seconds. In this case, server 302 does not remove QuoteID of XYZ-0-T from quote cache 110.

In one example, server 302 receives from client 310 a quote execute message 122 to execute quote XYZ-1-T In one example, server 302 determines that quote version ("1") of QuoteID of XYZ-1-T matches match quote version 112 (EXTERNAL_RFQVERSION) which is set to value of "1".

In one example, server 302 takes the action of executing a trade XYZ-1-T and sending to client 310 a success message 124 with a message indicating that the request to execute the traded for the requested quote was successful. In this case, the success message can include a text message such as "The quoted price/volume has been executed".

In one example, server 302 removes from the cache all versions of quote ABC.

FIGS. 7A through 7D is an example exchange platform 308 in accordance with aspects of the present disclosure. The block 700 illustrates an example exchange platform 308. In one example, exchange platform 308 may include a multiple dealer electronic platform to provide client computer 310 straight through processing to provide connection for requesting quotes from different sources. The platform 308 may provide for a connection with server 302 and can be used a financial institution such as a liquidity provider. The server may 302 provide support for option trading various means such as OTC (over the counter). In another example, the techniques of the present disclosure can be employed with servers 302 and clients 310 to provide processing of instruments in connection with exchange 308. The server 302 may be connected to financial institutions such as banking institutions for providing a dealing engine and providing data related to the financial instruments.

FIG. 7A describes features of platform 308 such as providing client computers 310 with a single interface to access quote data from multiple providers such as server computer 302, in one example.

FIG. 7B describes features of platform 308 such as providing client computers 310 with straight through processing to reduce operational risk, in one example.

FIG. 7C describes a flow process of platform 308 including for providing support for requests for quote and trade execution. Processing begins at a block 701, where platform 308 provides functionality for price discovery functionality for client computer and server computer, in one example. Processing proceeds to block 702, where platform 308 provides functionality for price request for stream (RFS) and request for quote (RFQ) functionality for client computer and server computer, in one example. Processing proceeds to block 703 as described below.

FIG. 7D describes features of platform 308 including for providing functionality for price support for request for quote and trade execution. Processing proceeds at block 703, where platform 308 provides functionality for price trade execution functionality for client computer and server computer, in one example. Processing proceeds to block 704, where platform 308 provides functionality for price request for trade checkout and STP for client computer and server computer, in one example.

Figure 8:
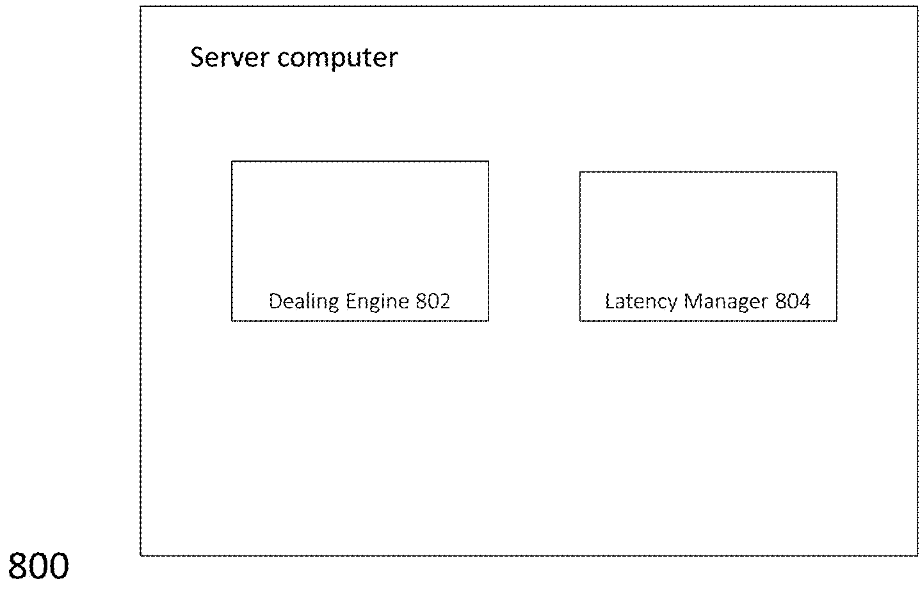
FIG. 8 is an example server computer in accordance with aspects of the present disclosure.

FIG. 8 is an example server 800 computer in accordance with aspects of the present disclosure. In one example, server 800 may implement the techniques of the present disclosure. In one example, server 800 may include a dealing engine 802 to determine pricing information for quotes, as described in the present disclosure. The server 800 may include a latency manager 804 for managing quote processing with client computers, as described in the present disclosure.

In one example, server 800 (including dealing engine 802 and latency manager 804) may provide seamless management of the entire options life cycle. The server 800 may offer technology to support all aspects of the FX options (FXO) and metal options life cycle, including: Pricing, Distribution, Structuring and trading, Portfolio management, Straight through processing (STP), External connectivity, as described below.

In one example, server 800 may provide Data Aggregation, Pricing and Analytics, Dealing, Distribution, Risk and Connectivity functionality.

Data Aggregation

In one example, server 800 may provide Data Aggregation functionality such as volume Aggregator-High quality data sourcing, aggregation and publishing. The Vol Aggregator provides a robust, customizable data feed for FXO and metals options that can be used throughout an organization. Accurate modelling and valuations are only possible if the underlying information is of the highest quality and reliability. The solution has three parts: Data sourcing: Real-time data is collected from a wide range of sources and data platforms, Aggregation: Quality is guaranteed through our aggregation modules and advanced data-cleansing algorithms, Publishing: Our data-publishing module provides distribution of prices and calculations to a wide variety of destinations, managing multiple price tiers and spreads, and including full validation of outgoing data, In example, Data sourcing may include an approach to data sourcing involves: Drawing data from a variety of sources based on client preference (over Thomson Reuters Enterprise Platform (TREP)/Reuters Market Data System (RMDS), the Bloomberg Market Data Feed (B-PIPE) as well as from ICE Data Services and via WebSphere MQ), Data quality checks on source data removing outliers, List of sources, configurable by time, with weightings, Integration with Gateway for receiving data, Backpressure handled through robust conflation solution.

In one example, aggregation may include advanced tech to guarantee the quality of the data: Aggregation uses one of various sophisticated algorithms, Data quality checks undertaken on aggregated data, Automated spreading, with ability to vary per tenor and time of day.

In one example, publishing may include wide-spread distribution includes: Publishing via TREP/RMDS and/or B-PIPE, Data validation generating alerts and/or preventing publishing, Configured integration to the Pro and TS products, Full audit trail.

In one example, DATA DISTRIBUTION may include a gateway for host messaging hub providing two-way communication between a customer's deployment and the many participants of the FX derivatives ecosystem, Inbound straight through processing (STP) of trades to TS (e.g., from selected execution venues), Outbound STP from TS to trade repositories or trade processing systems, Order routing mechanism (Deal Manager) to execution venues, Transmission of position values out of TS (for example, for valuation purposes and trade repositories), Market data contribution to the community and beyond.

Pricing and Analytics

In one example, server 800 may provide Pricing and Analytics functionality. In one example, server provide pricing models for exotic math are carefully designed to work the way a market practitioner would use them in the FXO and metals markets. The server may provide both an accurate price and also a tradable bid/ask spread, that can be immediately quoted, without the need for manual intervention. The server may provide a variety of pricing models built for market practitioners (see below), a customizable suite of volatility surface interpolation routines, market convention management for currency pairs, dates and formatting.

The server may provide Pricing models including Local Stochastic Volatility Model (LSV). The LSV incorporates the latest methodologies to provide the most accurate market pricing and spreading of first generation digital and barrier options. Supports the pricing of all first generation digital and barrier products (20 in total). Window barriers are supported (16 in total), as are quanto options on barriers and window barriers. Supplied with a calibration data feed for 60 top currency pairs. Ability to self-calibrate the LSV model for any currency pair.

The server may provide Pricing models including Monte Carlo Model. Options products utilize an expanded Monte Carlo plug-in that fully supports LSV-type models, Target Accrual Redemption Forwards (TARFs) and window barriers. Supports the pricing of 16 different types of window barriers including single and double barriers, as well as single and double digitals (touches). Provides flexibility to price all TARF classes and window barriers, either by a fast analytic model or a Monte Carlo model that supports term structure of volatility and interest rates, local volatility or local stochastic volatility.

The server may provide Pricing models including Vega Model. The Vega Convexity model is based on a Vanna-Volga approach to pricing first generation exotics. The Finite-Spread model uses a measure of the slope of the vol surface, which can be used for European barriers and digitals. Supports the pricing of single and double barrier and digital products (20 in total). Facilitates transparency and efficiency through direct entry and display of volatility smiles using market-traded butterfly and risk reversals. Supports automatic weighting and theoretical value adjustment (No Touch, or Expected Life), without the need for further calculation. Provides automatic algorithmic spreading of price for all classes outside the conventional techniques applied to vanillas.

The server may provide PRICE DISCOVERY functionality includes FX options and metal options. The technique leverages mathematical models and independent market data to provide consistent market value pricing for both vanilla and exotic options, across multi-leg and multi-currency strategies. The technique may also allow users to instantly access market-maker liquidity within options pricing. In one example, the techniques provide features such as Quality mathematical models, verified against actual, real-time traded prices from Partners' brokerage desks, to ensure accuracy of pricing, Users can select their preferred pricing methodology from a number of high quality providers, provide support for first through to third-generation exotic options, Users can access proprietary or third-party mathematical models through the interfaces to price options, delivers a real-time FX option data feed direct from the brokerage operations, also enables banks to receive data from internal broadcasting services, data vendors and other internet-based sources.

The server may provide PRICE MANAGEMENT functionality which includes FX options and metal options. When it comes to price management, the solution has a number of advanced features for the FXO and metals options sectors, including: Volatility surfaces manually managed or imported from real-time data platforms or spreadsheets, Volatility surface management, including event management, Market data spreading, Rules to determine whether requests are quoted by the system or routed to users for manual quoting, Volatility surfaces sourced from the electronic and voice brokerage operations, Real-time feed of OTC market data that includes spot, swap or forward outrights and USD deposit rates, Calibration data feeds to support the use of local stochastic volatility (LSV) maths models (Log-normal, Heston).

The server may provide PRICE DISTRIBUTION functionality which may include FX options and metal options functionality. Sales is an advanced component available within the techniques, which gives sales personnel and sales traders the independence to quote accurately and directly with traderbacked prices. They can also generate term sheets at the push of a button, helping them to improve accuracy and save time.

The techniques may provide complete sales solution in one platform which include Sales component features: Internal distribution of products to the sales organization via or existing interfaces, or bespoke front-end applications, External distribution of products to clients via multi-dealer platforms or bespoke frontend applications, Customer tiering and full record keeping of margin across stakeholder desks, A dealing engine that automates client price generation and distribution, Easy customization of workflow and rules for tradability, Tools such as graphing, product idea generation, term sheets and confirmations, Configurable term sheets and confirmations for client branding, Custom strategy design with instant distribution to sales personnel, A completely electronic sales to trader RFQ workflow, Full control over rollout of new structures and complete audit trail of RFQs.

The server may provide CONNECTIVITY functionality including connectivity to a Gateway which is hosted messaging hub that provides two-way communication between a customer's TS deployment and the many participants of the FX derivatives ecosystem. These include Inbound straight through processing (STP) of trades to TS (e.g., from selected execution venues), Outbound STP from TS to trade repositories or trade processing systems, Order routing mechanism (Deal Manager) to execution venues, Transmission of position values out of TS (for example, for valuation purposes and trade repositories), Market data contribution to the community and beyond, Through the Gateway connection, the server can offer connectivity to the following venues: Single dealer platforms (SDPs), Multi-dealer platforms (MDPs), Exchanges, Trade repositories (TRs), Central counterparties (CCPs), Middleware connectivity solution providers, Other clients.

The server's Gateway connection may provide key benefits such as a single connection to multiple venues eliminates the need to build a myriad of different connections and interfaces, Improved execution through access to multiple liquidity sources for price discovery and RFQ, Post-trade STP from single- and multi-dealer platforms removes the need for manual ticket capture and increases the speed of transaction processing while greatly reducing the danger of operational errors, Connections to trade repositories and CCPs help users to comply with complex global regulatory requirements as a direct extension of their existing workflow, Access to, and interaction with, the community.

The server's Gateway connection may provide technical features such as using the market standard FIX messaging protocol, Messaging traffic encrypted via HTTPS, 24/5 support monitoring connectivity to ensure no loss of service, and Ability for putting prices on screens.

Dealing

In one example, server 800 may provide Dealing functionality. The server provides a Dealing Engine which is a central process that governs the workflow of a deal from prerequest to trade. It ensures that a deal is checked at various stages in the workflow and only allows it to proceed to the next stage when the check is successful. The Dealing Engine is configured to govern the following four stages of the dealing workflow. Data Check-Early price discovery stage. Data Check provides a preliminary checking on the counterparty information provided and selects a tier accordingly Price Check-Price discovery stage. Price Check provides a quick check on the various user-provided information, such as product type, currency pair, maturity and tier. RFQ Check-Request stage. In addition to the data checked at the Price Check stage, RFQ Check (request for quote) also checks for optional data such as amounts and deltas (both at the structure and leg level). Trade Check-Deal booking stage. In addition to all the checks performed by RFQ Check, Trade Check will also check for quote time validity, quote status, spot movement, and price movement.

The server provides DEALING DISTRIBUTION functionality. The Liquidity APIs (application programming interfaces) are designed to enhance dealing workflow solutions between systems. The suite of APIs includes: Liquidity API. The Liquidity API interacts with the components of Pro, which are responsible for sending and responding to requests. This extends the sophistication of price distribution to auto-dealing workflow solutions. The Liquidity API is also designed for simple integration with other systems and can be called by any system capable of making HTTP requests. Liquidity Settings API The Liquidity Settings API facilitates programmatic interaction with the components of Pro that are responsible for adding, modifying, and removing dealing rules through the Liquidity Settings screen. The Liquidity Settings API is essential for specifying dealing rules in real-time workflow solutions.

The server provides deal capture functions. Straight Through Processing (STP). Bi-directional STP allows the STP server to send trades in real time to core and/or back-office systems. The STP application program interface (API) also allows you to create a custom interface that specifies how, where and what trade information to export/import between and the down-stream target system.

Distribution

In one example, server 800 may provide Distribution functionality. Price distribution includes FX options and metal options, Sales is an advanced component available within Options Pro, which gives sales personnel and sales traders the independence to quote accurately and directly with trader-backed prices. They can also generate term sheets at the push of a button, helping them to improve accuracy and save time. A complete sales solution in one platform that includes Sales component features: Internal distribution of products to the sales organization via or existing interfaces or bespoke front-end applications, External distribution of products to clients via multi-dealer platforms or bespoke front end applications, Customer tiering and full record keeping of margin across stakeholder desks, A dealing engine that automates client price generation and distribution, Easy customization of workflow and rules for tradability, Tools such as graphing, product idea generation, term sheets and confirmations, Configurable term sheets and confirmations for client branding, Custom strategy design with instant distribution to sales personnel, A completely electronic sales to trader Request for Quote (RFQ) workflow, Full control over rollout of new structures and complete audit trail of RFQs.

The Dealing Distribution functions. The Liquidity APIs (application programming interfaces) are designed to enhance dealing workflow solutions between systems. The suite of APIs includes: Liquidity API. The Liquidity API interacts with the components of Pro, which are responsible for sending and responding to requests. This extends the sophistication of price distribution auto-dealing workflow solutions. The Liquidity API is also designed for simple integration with other systems and can be called by any system capable of making HTTP requests. Liquidity Settings API The Liquidity Settings API facilitates programmatic interaction with the components of Pro Options that are responsible for adding, modifying, and removing dealing rules through the Liquidity Settings screen. The Liquidity Settings API is essential for specifying dealing rules in real-time workflow solutions.

The Risk Distribution includes the same extensive reporting capabilities that are available in Pro, are offered programmatically by the Risk API (application programming interface). This allows users to report on any aspect of their portfolio. Reports can be executed in the following ways: ·In the Pro GUIs (graphical user interfaces), Inside a web browser, using the Reporting Server, On a scheduled basis using a scheduler, Programmatically using the Risk API, Data Distribution. Pro-Market Data API, the Market Data API allows users to publish spot, depos, swaps, and volatilities data into the Pro database using XML.

Risk

In one example, server 800 may provide Risk functionality. The Risk and Lifecycle Management: The Options Risk module enables users to run the critical reports required for: ·Front office portfolio management, ·Risk management, ·Decision support, ·Client reporting. Its powerful reporting and risk engines also allow reports to be customized in real time, providing an instant overview of position mark-to-market and risk profiles. Meanwhile, the TS suite of open APIs (application programming interfaces) expands the core technology of Risk to power: ecommerce platforms, automated quote responding, quote execution and various connectivity solutions. Options Risk includes: ·Deal capture with easy customization of ticket details, ticketing workflows and permissions, ·Straight through processing (STP) server can send trades in real-time to core, back-office systems and/or trade repositories and central counterparties (CCPs), ·Life-cycle management tools for options and cash; expiries, fixings, end of day processes and rollovers, ·Risk reports for portfolio management, risk management and a decision support tool for traders, ·Customer-based reporting, allowing sales desks and clients to view their portfolios, and trade performance, ·They can also conduct life-cycle sales management to track sales team performance, ·Full support for recording and reporting on margin or sales profit for the various stakeholder desks involved in the trade life-cycle, ·Sensitivity reports to calculate how changes in market conditions affect a portfolio, ·Graphical representation of reports can be created in either two or three dimensions, ·The ability to drill down on a position within a report and see the component tickets and their individual risks that contribute to that position, ·Dream tickets used to analyze a 'hypothetical trades' potential position impact, ·Individual reports can be run using a specified market scenario of choice, ·The flexibility of Risk allows users to run any report on demand or via a scheduled automated process, ·Automated trigger alerts for barrier events.

The Risk Distribution includes a Risk engine. The Options Risk module enables users to run the critical reports required for: ·Front office portfolio management, ·Risk management, ·Decision support, ·Client reporting. Its powerful reporting and risk engines also allow reports to be customized in real time, providing an instant overview of position mark-to-market and risk profiles. Reports can be executed in the following ways: ·In the Pro GUIs (graphical user interfaces), ·Inside a web browser, using the Reporting Server, ·On a scheduled basis using a scheduler, ·Programmatically using the Risk API, Straight Through Processing (STP), Bi-directional STP allows the STP server to send trades in real time to core and/or back-office systems. The STP API also allows you to create a custom interface that specifies how, where and what trade information to export/import between and the downstream target system.

Connectivity

In one example, server 800 may provide Connectivity functionality. CONNECTIVITY includes: Gateway Deal Manager (DM) allows users to: ·Price a FXO product, ·Route orders to enabled trading venues, ·See indicative prices from certain permissioned venues. A Gateway Deal Blotter (DB) web page will also enable support and client users to monitor request for quote (RFQ) and straight through processing (STP) statuses. If the connection goes down, STP messages can be retransmitted: ·Users can access DM via the Options products, sales component, or a web browser, ·DM is able to specify option details upfront, including request type, premium currency and delta hedge requirement, ·No need to leave the screen to create order/request to trade, ·No manual rekeying of trade requests, ·Possible to have combination of both venues, ·Possible to hit both multiple venue buttons at the same time, ·Includes STP to Pro, ·Operational risk can be reduced by transmitting trades automatically back to Pro, ·Book mapping to define which portfolio the trade should be routed to ·staff are agnostic to DM venues, ·Current venues offer auto liquidity from up to 12 banks, as well as manual liquidity from a further 18 banks. The Gateway is a hosted messaging hub that provides two-way communication between a customer's TS deployment and the many participants of the FX derivatives ecosystem. Gateway functionality: ·Inbound straight through processing (STP) of trades to TS (e.g., from selected execution venues), ·Outbound STP from TS to trade repositories or trade processing systems, ·Order routing mechanism (Deal Manager) to execution venues, ·Transmission of position values out of TS (for example, for valuation purposes and trade repositories), ·Market data contribution to the community and beyond. Gateway can offer connectivity to the following venues: ·Single dealer platforms (SDPs), ·Multi-dealer platforms (MDPs), ·Exchanges, ·Trade repositories (TRs), ·Central counterparties (CCPs), ·Middleware connectivity solution providers, ·Other clients. Gateway: Key benefits: ·A single connection to multiple venues eliminates the need to build a myriad of different connections and interfaces, ·Improved execution through access to multiple liquidity sources for price discovery and RFQ (request for quote), ·Post-trade STP from single and multi-dealer platforms removes the need for manual ticket capture and increases the speed of transaction processing while greatly reducing the danger of operational errors, ·Connections to trade repositories and CCPs help users to comply with complex global regulatory requirements as a direct extension of their existing workflow, ·Access to, and interaction with, the community.

Technical: ·Gateway uses the market standard FIX messaging protocol, ·Messaging traffic encrypted via HTTPS, ·24/5 support monitoring connectivity to ensure no loss of service. Publishing to venues: offers both the technology and infrastructure to manage and publish market data sets such as full volatility surface to both internal and external recipients. The Data Publisher can publish products to Pro that facilitate real time or scheduled publication of data internally or externally.

Although the disclosure herein has been described with reference to particular examples, it is to be understood that these examples are merely illustrative of the principles of the disclosure. It is therefore to be understood that numerous modifications may be made to the examples and that other arrangements may be devised without departing from the spirit and scope of the disclosure as defined by the appended claims. Furthermore, while particular processes are shown in a specific order in the appended drawings, such processes are not limited to any particular order unless such order is expressly set forth herein. Rather, various steps can be handled in a different order or simultaneously, and steps may be omitted or added.

The invention claimed is:

1. An apparatus comprising:

a memory comprising a quote cache, and a quote queue;

a network interface;

at least one processor configured to perform a latency management process to:

set a configurable timeout period based on a measured latency of a network;

in response to a request for a stream of quote data versions related to a financial instrument from a client computer, transmit, via the network interface to the network, to the client computer a message that includes a stream of quote data versions from the quote queue that are based on client preference updates from a plurality of quote data sources;

periodically check the quote cache to determine whether to remove a quote data version from the quote cache;

maintain the quote cache by selectively copying a latest quote version based on a most recently received quote data versions and removing quote data versions having a time age greater than the configurable timeout period;

receive, via the network interface to the network, from the client computer, a request to execute a requested quote data version selected from the stream of quote data versions; and determine whether to execute a trade of the financial instrument at a price in the requested quote data version based on whether (a) the requested quote data version matches the latest quote version, (b) the requested quote data version is present in the quote cache and (c) a time age of the requested quote data version is less than the configurable timeout period.

2. The apparatus of claim 1, wherein the time age is calculated based on a difference between a current system time and a time stamp of the requested quote data version.

3. The apparatus of claim 1, wherein the time age of the requested quote data version is calculated based on a difference between a system time stamp of the request for the stream of the quote data versions and a time stamp of the requested quote data when placed in the quote cache.

4. The apparatus of claim 1, further comprising storing quote data versions to the quote queue and then copying the quote data versions to the quote cache and transmitting to the client computer the quote data versions.

5. A non-transitory computer-readable medium storing a plurality of executable instructions, wherein execution of the plurality of executable instructions by one or more processors causes the one or more processors to performing a plurality of operations comprising:

setting a configurable timeout period based on a measured latency of a network;

in response to a request for a stream of quote data versions related to a financial instrument, transmitting, via a network interface, to a client computer a message that includes a stream of quote data versions from a quote queue that are based on client preference updates from quote data sources;

periodically checking the quote queue to determine whether to remove a quote data version from a quote cache;

maintaining the quote cache by selectively copying a latest quote version based on a most recently received quote data versions and removing quote data versions having a time age greater than the configurable timeout period;

receiving, via the network interface, from the client computer, a request to execute a requested quote data version selected from the stream of quote data versions; and determining whether to execute a trade of the financial instrument at a price in the requested quote data version based on whether (a) the requested quote data version matches the latest quote version, (b) the requested quote data version is present in the quote cache and (c) a time age of the requested quote data version is less than the configurable timeout period.

6. The non-transitory computer-readable medium of claim 5, wherein the time age is calculated based on a difference between a current system time and a time stamp of the requested quote data version.

7. The non-transitory computer-readable medium of claim 5, wherein the time age of the requested quote data version is calculated based on a difference between a system time stamp of the request for the stream of the quote data versions and a time stamp of the requested quote data when placed in the quote cache.

8. The non-transitory computer-readable medium of claim 5, wherein the plurality of operations further comprises storing quote data versions to the quote queue and then copying the quote data versions to the quote cache and transmitting to the client computer the quote data versions.

9. A method comprising:

setting a configurable timeout period by at least one processor based on a measured latency of a network;

in response to a request for a stream of quote data versions related to a financial instrument, transmitting by the at least one processor, via a network interface, to a client computer a message that includes a stream of quote data versions from a quote queue that are based on client preference updates from quote data sources;

periodically checking the quote queue to determine whether to remove a quote data version from a quote cache;

maintaining the quote cache by selectively copying a latest quote version based on a most recently received quote data versions and removing quote data versions having a time age greater than the configurable timeout period by the at least one processor;

receiving, via the network interface, from the client computer, a request to execute a requested quote data version selected from the stream of quote data versions; and determining whether to execute a trade of the financial instrument at a price in the requested quote data version based on whether (a) the requested quote data version matches the latest quote version, (b) the requested quote data version is present in the quote cache and (c) a time age of the requested quote data version is less than the configurable timeout period by the at least one processor.

10. The method of claim 9, wherein the time age is calculated based on a difference between a current system time and a time stamp of the requested quote data version.

11. The method of claim 9, wherein the time age of the requested quote data version is calculated based on a difference between a system time stamp of the request for the stream of the quote data versions and a time stamp of the requested quote data when placed in the quote cache.

12. The method of claim 9, further comprising storing quote data versions to the quote queue and then copying the quote data versions to the quote cache and transmitting to the client computer the quote data versions.

* * * * *